US007025675B2

(12) United States Patent
Fogel et al.

(10) Patent No.: US 7,025,675 B2
(45) Date of Patent: Apr. 11, 2006

(54) VIDEO GAME CHARACTERS HAVING EVOLVING TRAITS

(75) Inventors: David B. Fogel, La Jolla, CA (US); Timothy J. Hays, La Jolla, CA (US); Douglas R. Johnson, San Diego, CA (US); Thomas P. Lang, Jr., Santa Fe, CA (US)

(73) Assignee: Digenetics, Inc., La Jolla, CA (US)

( * ) Notice: Subject to any disclaimer, the term of this patent is extended or adjusted under 35 U.S.C. 154(b) by 0 days.

(21) Appl. No.: 10/651,907

(22) Filed: Aug. 29, 2003

(65) Prior Publication Data

US 2004/0053690 A1    Mar. 18, 2004

Related U.S. Application Data

(63) Continuation of application No. 09/748,454, filed on Dec. 26, 2000, now abandoned.

(51) Int. Cl.
*A63F 9/22* (2006.01)
(52) U.S. Cl. ............... 463/9; 462/43; 709/203; 345/473
(58) Field of Classification Search ............... 463/9, 463/43, 1; 345/473; 709/203
See application file for complete search history.

(56) References Cited

U.S. PATENT DOCUMENTS 6,002,401 A * 12/1999 Baker .................... 715/839
6,009,458 A * 12/1999 Hawkins et al. ........... 709/203
6,183,364 B1 * 2/2001 Trovato .................... 463/32
6,220,595 B1 * 4/2001 Callan ..................... 273/237
6,253,167 B1 * 6/2001 Matsuda et al. ............ 703/11
6,267,677 B1 * 7/2001 Tajiri et al. ............... 463/43
6,545,682 B1 * 4/2003 Ventrella et al. .......... 345/473

OTHER PUBLICATIONS

Monster Rancher 2, IGN.com, Oct. 7, 1999.*
Spivey, Monster Rancher FAQ, Jun. 24, 1999.*
SimLife, The Genetic Playground, Maxis, 1992.*
Ventrella, Disney Meets Darwin, MIT, 1994.*

* cited by examiner

*Primary Examiner*—Corbett Coburn
(74) *Attorney, Agent, or Firm*—DLA Piper Rudnick Gray Cary US LLP

(57) ABSTRACT

A server-based video game system maintains a number of video game characters having computer-simulated genetic ("digenetic") structures that prescribe a number of physical and cognitive performance traits and characteristics for the video game characters. The system allows end users to establish remote online access to the game characters (via, e.g., the Internet). The results of competitions and training activities are based upon the game characters' digenetics, the conditions of the game environment, and the game characters' current levels of physical and cognitive development. The game characters' performance capabilities and cognition are updated continuously in response to the results of competitions and training activities. Competition and training results can be processed by the game servers and transmitted to the end user presentation devices for graphics rendering. In this manner, the video game system need not be burdened by network latency and other delays. The game system also supports game character breeding; game character evolution based upon the digenetics; and game character buying, trading, selling, and collecting.

32 Claims, 8 Drawing Sheets

VIDEO GAME CHARACTERS HAVING EVOLVING TRAITS

RELATED APPLICATIONS

This application is a continuation of U.S. patent application Ser. No. 09/748,454, filed Dec. 26, 2000 now abandoned. This application is related to U.S. patent application Ser. No. 09/748,362, titled "Interactive Video Game System with Characters that Evolve Physical and Cognitive Traits," filed Dec. 26, 2000 now abandoned.

FIELD OF THE INVENTION

The present invention relates generally to video gaming systems. More particularly, the present invention relates to a video game characters having physical, emotional, and cognitive traits and digitally represented genetic characteristics.

BACKGROUND OF THE INVENTION

The prior art is replete with stand-alone video game systems, personal computer (PC) video games and simulation programs, network-based interactive game technologies, handheld computer games, and the like. Many conventional video game systems utilize complex branching programs that dictate the conduct of game characters and the outcome of game situations in response to the current status of specific operating parameters. Traditional role playing games allow a user to control the development of a game character in response to specific queries, options, decisions, and interaction with other characters. Many video game programs are episodic, i.e., the game continues so long as the game character "survives" and progresses through various stages of the game. Other video games feature game characters having specific and predetermined characteristics and programmed behavioral responses.

A number of prior art simulation programs allow end users to breed and care for virtual pets, animals, or other characters. Other known game systems utilize simulation algorithms and/or artificial intelligence techniques that determine how a computer-generated game character responds to (and learns from) different game situations and conditions. However, most of these programs merely operate in accordance with specific instructions and decisions. In other words, the virtual characters in these programs do not live and react according to a set of traits, physical characteristics, or cognitive or emotional characteristics. Rather, the virtual characters respond in a restricted manner based upon particular user inputs and game parameters.

With few exceptions, prior art video game systems are deficient because they do not feature game characters that evolve, learn from experience, age, and/or function in accordance with a number of different traits. With few exceptions, prior art game systems do not utilize game characters having "genetic" structures that affect the manner in which the game characters (whether user-controlled or computer-generated) react to the gaming environment. In addition, most prior art gaming systems do not allow end users to breed, develop, train, and compete their game characters over time.

BRIEF SUMMARY OF THE INVENTION

The present invention provides an improved video game system and architecture that utilizes game characters having evolutionary capabilities. Unlike prior art game systems that are programmed to generate predetermined results according to specific game conditions, a system according to the present invention employs evolutionary computation techniques in connection with the behavior and capabilities of the game characters. In one practical embodiment, each game character ("digenome") has a unique digital genetic ("digenetic") structure that prescribes the physical capabilities, emotional characteristics, cognitive characteristics, physical appearance, and/or other traits of the game character. The digenetics of a game character can also influence levels of expertise, training, and physical and mental prowess exhibited by the game character during its life in a persistent gaming environment.

In the context of a preferred network-based implementation of the present invention, each game character or digenome "lives" in a potentially perpetual universe maintained at one or more centralized servers. The performance characteristics, appearance characteristics, physical capabilities, and cognitive characteristics of the digenomes (which are preferably updated over time) are stored at the server level. The digenetic patterns of the digenomes are stored in a secure manner at the server level. In this manner, end users can interact with the virtual and perpetual gaming world in a remote manner via, e.g., the Internet. The server-based game system simulates the development of the digenomes, competition results, and evolution of digenomes by processing the current digenetic data, digenome characteristic data, game environment data, and other data that may be updated continuously over time.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of video game platforms and program genres and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for signal processing, data transmission, evolutionary computation, video graphics generation, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

General System Environment

Figure 1:
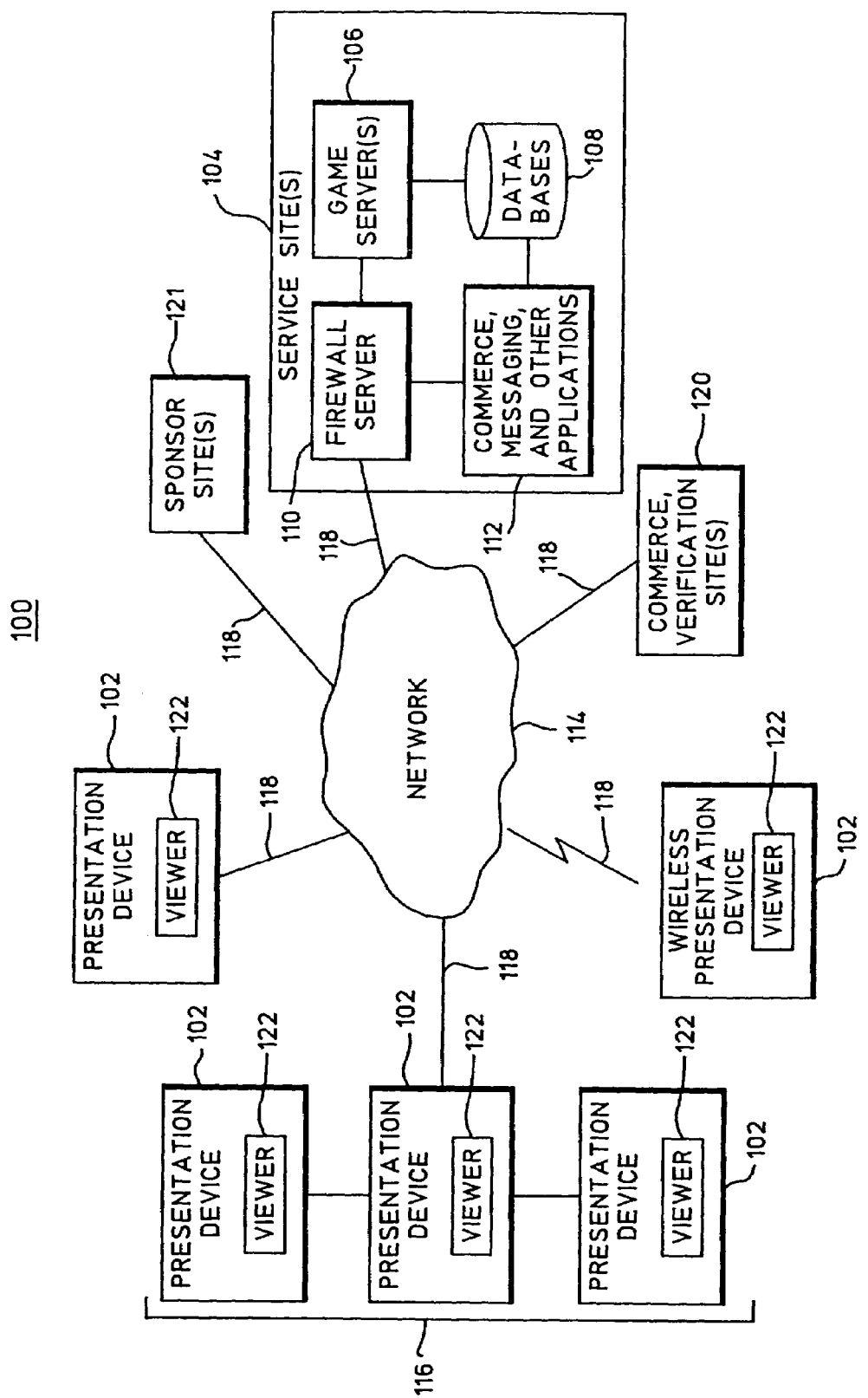
FIG. 1 is a schematic representation of a network-based video game system according to the present invention.

FIG. 1 is a schematic representation of a video game system 100 in which the techniques of the present invention may be implemented. System 100 is suitably configured to maintain a centralized and server-driven video game environment that can be accessed by any number of remote end users. System 100 is depicted in a generalized manner to reflect its flexible nature and ability to cooperate with any number of different communication systems, service providers, and end user devices. This description may use the term "digenome" to refer to a game character supported by system 100, whether user-controlled or computer-controlled. In a practical computer or video game implementation, the simulated genetic composition of a game character can be realized in an electronic or digital manner. Accordingly, this description may use the terms "digital genetics," "digenetics," or "digenetic" to refer to the simulated genetic code, pattern, composition, or structure associated with a game character supported by system 100.

System 100 may include any number of end user presentation devices 102, each preferably having an associated display element, that communicate with at least one service site 104. Service site 104 preferably includes a number of game servers 106 configured to support the features and functionality described herein and at least one database 108 in communication with servers 106. In the context of a practical implementation, service site 104 may include a firewall server 110 that functions to securely isolate and protect servers 106. Service site 104 may also include other suitably configured servers (not shown), including, without limitation, a web server, a file transfer protocol (FTP) server, electronic commerce servers, and a simple mail transfer protocol (SMTP) server. These additional servers, along with their corresponding features and functionality, are generally represented in FIG. 1 by the "commerce, messaging, and other applications" block 112. Although depicted as though game servers 106 (and other servers associated with service site 104) are commonly located, video game system 100 may utilize a distributed server architecture in which a number of servers communicate and operate with one another even though placed in different physical locations.

As used herein, a "server" refers to a computing device or system configured to perform any number of functions and operations associated with video game system 100. Alternatively, a "server" may refer to software that performs the processes, methods, and/or techniques described herein.

From a hardware perspective, system 100 may utilize any number of commercially available servers, e.g., the IBM AS/400, the IBM RS/6000, the SUN ENTERPRISE 5500, the COMPAQ PROLIANT ML570, and those available from UNISYS, DELL, HEWLETT-PACKARD, or the like. Such servers may run any suitable operating system such as UNIX, LINUX, or WINDOWS, and may employ any suitable number of microprocessor devices, e.g., the PENTIUM family of processors by INTEL or the processor devices commercially available from ADVANCED MICRO DEVICES, IBM, SUN MICROSYSTEMS, or MOTOROLA.

The server processors communicate with system memory (e.g., a suitable amount of random access memory), and an appropriate amount of storage or "permanent" memory. The permanent memory may include one or more hard disks, floppy disks, CD-ROM, DVD-ROM, magnetic tape, removable media, solid state memory devices, or combinations thereof. In accordance with known techniques, the operating system programs and any server application programs reside in the permanent memory and portions thereof may be loaded into the system memory during operation. In accordance with the practices of persons skilled in the art of computer programming, the present invention is described below with reference to symbolic representations of operations that may be performed by one or more servers associated with video game system 100. Such operations are sometimes referred to as being computer-executed. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software, various elements of the present invention are essentially the code segments that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

As used herein, a "user device" or a "presentation device" is any device or combination of devices capable of providing information to an end user of video game system 100. For example, a presentation device 102 may be a personal computer, a television monitor, an Internet-ready console, a wireless telephone, a personal digital assistant (PDA), a home appliance, a component in an automobile, a video game console, or the like. Presentation devices 102 are preferably configured in conventional ways known to those skilled in the art. In addition, presentation devices 102 may be suitably configured to function in accordance with certain aspects of the present invention, as described in more detail herein. For example, any number of known video game consoles (some of which may need to be modified for compliance with system 100) can be used in the context of system 100, including, without limitation, PLAYSTATION by SONY, DREAMCAST by SEGA, and X-BOX by MICROSOFT. For the sake of clarity and brevity, conventional and well-known aspects of presentation devices 102 are not described in detail herein.

In the preferred embodiment, video game system 100 is capable of supporting a plurality of different presentation devices 102 (operated by any number of end users) in a simultaneous manner. In practice, a single end user may utilize a plurality of presentation devices 102 in conjunction with system 100. For example, a person may use a desktop computer at the office, a portable laptop computer while traveling, and/or a video game console at home. System 100 is capable of supporting the integrated use of such multiple devices in a manner that enables the user to access service site 104 and utilize the features of the present invention via the different presentation devices 102. In addition, system 100 is preferably configured to support a plurality of end users, each of which may have personal data or individual preferences and display settings associated therewith. Such user-specific characteristics may be suitably stored in databases 108 and managed by system 100.

In accordance with one preferred embodiment, presentation devices 102 communicate with service site 104 via a network 114, e.g., a local area network (LAN) a wide area network (WAN), or the Internet. In addition, one or more presentation devices 102 can be arranged as a LAN, a WAN, or other network (as identified by reference number 116). It should be appreciated that the present invention need not utilize network 114, e.g., any number of presentation devices 102 can be connected directly to service site 104. In the preferred embodiment, network 114 is the Internet and each of the individual presentation devices 102 is configured to establish connectivity with the Internet using conventional application programs and conventional data communication protocols. For example, each presentation device 102 preferably includes a web browser application such as NETSCAPE NAVIGATOR or INTERNET EXPLORER and each presentation device 102 may be connected to the Internet via an internet service provider (ISP) (not shown in FIG. 1).

In a practical embodiment, presentation devices 102 and service site 104 are connected to network 114 through various communication links 118. As used herein, a "communication link" may refer to the medium or channel of communication, in addition to the protocol used to carry out communication over the link. In general, a communication link may include, but is not limited to, a telephone line, a modem connection, an Internet connection, an Integrated Services Digital Network (ISDN) connection, an Asynchronous Transfer Mode (ATM) connection, a frame relay connection, an Ethernet connection, a coaxial connection, a fiber optic connection, satellite connections (e.g., Digital Satellite Services), wireless connections, radio frequency (RF) connections, electromagnetic links, two-way paging connections, and combinations thereof.

Communication links 118 may be suitably configured in accordance with the particular communication technologies and/or data transmission protocols associated with the given presentation device 102. For example, a communication link 118 may utilize broadband data transmission techniques, the TCP/IP suite of protocols, the wireless application protocol (WAP), hypertext markup language (HTML), extensible markup language (XML), or a combination thereof. Communication links 118 may be established for continuous communication and data updating or for intermittent communication, depending upon the infrastructure.

As mentioned above, the various system servers preferably communicate with one or more databases 108. A given database 108 may be maintained at service site 104 or maintained by a third party external to the overall architecture of video game system 100. Databases 108 are preferably configured to communicate with the system servers in accordance with known techniques. In a practical embodiment, databases 108 may be realized as conventional SQL databases, e.g., ORACLE-based databases.

The databases 108 preferably contain some or all of the following data (without limitation): end user profiles; end user preferences; digenome data, e.g., digenetic information, current state of physical conditioning, current emotional state, current cognitive state, cognitive parameters, age, current attained levels of performance, performance capabilities, current appearance characteristics, and the like; historical training and competition data; and any other information necessary to carry out the techniques of the present invention as described herein. The end user profiles may include names, email addresses, account information, and mailing addresses.

In a practical application, video game system 100 may communicate with any number of commerce verification sites 120. Such verification sites 120 may be desirable to enable system 100 to accept online credit card payments, electronic fund transfers, and other forms of remote payments. Verification sites 120 may be maintained by the entity responsible for maintaining video game system 100 or by a third party.

Video game system 100 may be deployed in a manner that allows partnering with any number of sponsors. For example, a corporate or private entity may sponsor competitions between game characters, specific competition venues maintained by video game system 100, or training facilities maintained by video game system 100. In an Internet implementation, such sponsors may maintain corresponding sponsor web sites 121 and any number of web sites maintained by service site 104 may include links to sponsor web sites 121.

As described in more detail below, the preferred embodiment of video game system 100 performs the majority of the game processing at service site 104. Presentation devices 102 allow the end users to: access the server-based game environment; provide system inputs, controls, requests, and instructions related to the game programs; receive emails and/or other messages generated by system 100 or by other end users; receive media files, information, or data associated with various game playing scenarios; process competition or training results; and create animation graphics associated with competitions and training sessions. Although not a requirement of the present invention, each presentation device 102 preferably includes a viewer 122, which may be realized as a locally resident software program application. Viewer 122 may be a separate executable program or a graphics application that runs in conjunction with a web browser (or other application program) installed on the presentation device 102. In a practical application, an end user can download viewer 122 directly from service site 104 via network 110.

Viewer 122 is suitably configured to enable an end user to access and view the gaming environment maintained on game servers 106. In accordance with one practical embodiment, viewer 122 includes advanced three-dimensional graphics and rendering capabilities, multimedia drivers, scripting elements, animation elements, multimedia programming interfaces, three-dimensional graphics drivers, three-dimensional sound drivers, streaming data libraries, other programming libraries, interfaces to multiple input devices, and/or other features that enhance the end user's game playing experience. For example, viewer 122 may employ known techniques and applications such as DirectX, Flash, and other commercially available products. In addition, viewer 122 may be suitably configured to allow the end user to create or design a digital identity or avatar that represents the "online" presence of the end user. Viewer 122 may project the end user's avatar into the gaming environment as the end user moves about and watches events as they occur.

Using viewer 122, the perpetual universe maintained and updated by game servers 106 can be displayed as a three-dimensional world having a dynamic environment. The viewer 122 preferably allows the end user to change his viewpoint while interacting in the perpetual universe. For example, viewer 122 may support various "camera" angles and perspectives such as: from behind the avatar (i.e., "third person" view); from the perspective of the avatar (i.e., "first person" view); a circling camera; a camera floating above the avatar; from a selected digenome's view; from the perspective of a referee or umpire; security cameras; selected fixed camera viewpoints; and other viewpoints depending upon the particular system.

An alternate embodiment of video game system 100 need not employ viewer 122. For example, a presentation device 102 without viewer 122 may rely on the graphics and display capabilities of a web browser application and/or other applications resident on the presentation device 102 itself. In such an embodiment, advanced graphics features may not be fully supported.

Game Server Architecture

Figure 2:
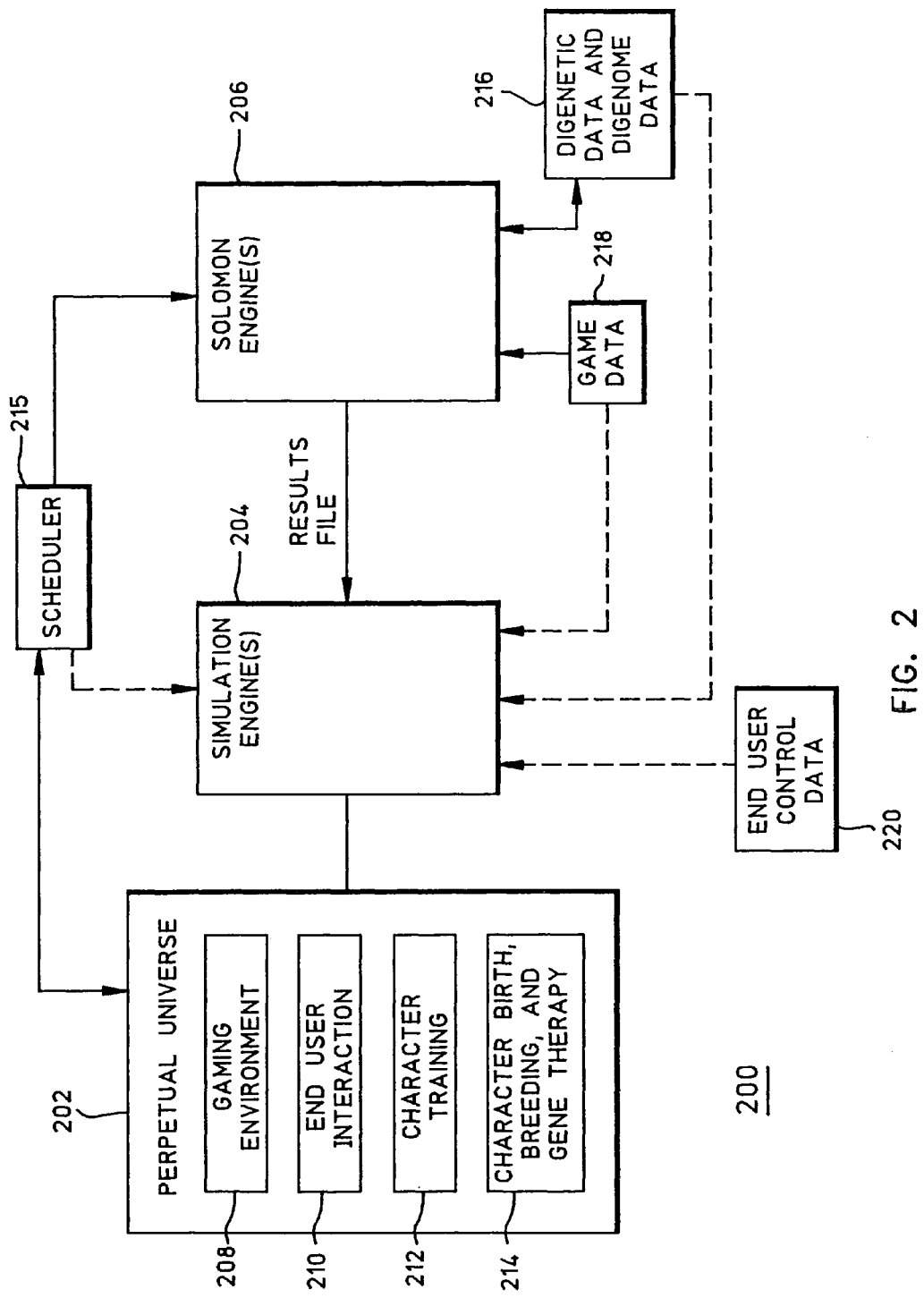
FIG. 2 is a schematic representation of a game server architecture suitable for use in a video game system according to the present invention.

FIG. 2 is a schematic representation of a game server architecture 200 suitable for use in video game system 100. Game servers 106 may employ game server architecture 200 (or portions thereof). As described above, the various functional components shown in FIG. 2 may be realized by any number of software program modules resident on any number of suitable computing or processing devices. In a practical embodiment, the software elements shown in FIG. 2 (and possibly other software applications and elements) are executed by one or more servers to carry out the various processes described herein. The functional aspects of these software components are described in more detail below.

Game server architecture 200 preferably includes at least one perpetual universe server 202 and at least one simulation engine 204 operatively coupled to perpetual universe server 202. Video game system 100 can utilize any number of simulation engines 204, e.g., one simulation engine for each gaming environment or genre. Of course, the number of simulation engines 204 can vary from system to system depending upon the number of end users, the processing capacity of service site 104, and other practical considerations. Game server architecture 200 may also include one or more processing engines (also referred to herein as Solomon engines) 206 operatively coupled to simulation engine 204. Briefly, perpetual universe server 202 maintains the general gaming environment of video game system 100. Simulation engine 204 generates competition or activity results for one or more digenomes, based on the capabilities and characteristics of the digenomes. Solomon engine 206 may be employed to determine the outcome of a competition or activity, based on the capabilities and characteristics of the digenomes. In turn, simulation engine 204 receives the outcome determined by Solomon engine 206 and creates a suitable animation script file for that competition or activity.

Perpetual universe server 202 comprises one or more software programs and/or modules that serve as the foundation for video game system 100. Perpetual universe server 202 is preferably configured to communicate with the other software components of system 100. Perpetual universe server 202 is also configured to process system data generated by service site 104, end user data generated by presentation devices 102, and/or other information managed by system 100. Briefly, perpetual universe server 202 may include or support, without limitation, the following features: a number of gaming environments 208; end user interaction 210; digenome character training 212; digenome character birth, breeding, and gene therapy 214; and the scheduling of digenome competitions or training sessions.

The Perpetual Universe and Gaming Environments

Perpetual universe server 202 may function to operate, maintain, monitor, and update the rendered virtual world, game environments, active digenomes, and/or end user avatars at all times. The perpetual universe server 202 may be suitably configured to process three-dimensional wire frame geometry and locations of the three-dimensional elements within the perpetual universe. Perpetual universe server 202 may also track the movement of all dynamic objects, digenomes, and avatars in the perpetual universe. In the preferred embodiment, perpetual universe server 202 need not process, generate, or render any graphics; the presentation devices 102 handle the graphics rendering corresponding to any number of animation files or scripts received from perpetual universe server 202.

Perpetual universe server 202 is preferably configured to maintain and update (periodically, a periodically, or continuously) any number of gaming environments 208 supported by system 100. As used herein, a "gaming environment" is the game-playing world generated and maintained by system 100. For example, the perpetual universe may include any number of thematic environments having different locations that combine to simulate a virtual world or a theme park setting. In particular, one theme location may emulate ancient Rome where gladiator digenomes can live and compete. Another theme location may emulate medieval England where knight digenomes can live and compete. The server-based nature of system 100 facilitates growth and modification of such thematic environments and the addition of new thematic environments as necessary to support additional users.

In one practical embodiment, the end users can view and interact with the gaming environment in the context of their online persona and/or in the context of their digenomes. A gaming environment may include any suitable content generated by system 100 for rendering on the presentation devices. System 100 preferably updates the gaming environment with the current positions, actions, and/or status of the digenomes and avatars in a substantially real-time manner. Perpetual universe server 202 may track the movements of end user avatars such that the end users can view the current locations of opposing avatars within the perpetual universe. This feature can spark communication between users when they notice certain end user avatars frequently visiting favorite areas, allowing the users to engage a chat or messaging session with end users that they otherwise may not know.

Video game system 100 may support any number of different gaming environments 208 associated with any number of game genres. For example, one gaming environment may be suitably designed to support battles between digenomes that represent tanks. Another gaming environment may be alternatively configured to support competitions between digenomes that represent boxers or wrestlers. Yet another gaming environment may be designed to support races between digenomes that represent automobiles, airplanes, boats, skateboarders, or the like. In this respect, the context of the game genre may dictate the manner in which system 100 represents each specific gaming environment 208; a given gaming environment 208 may include any number of genre-specific features.

In the preferred practical embodiment, the various gaming environments 208 are "perpetual" or "persistent" in nature because video game system 100 sustains any number of computer-generated or user-controlled digenomes in a substantially autonomous and ongoing manner. Indeed, video game system 100 may stage competitions between computer-controlled digenomes independent of any end user interaction. In addition, system 100 may stage a competition that involves an end user's digenome without the knowledge of that end user (unless system 100 allows the end user to prohibit such "offline" competitions). In this respect, the gaming environment or perpetual universe need not (and preferably does not) remain static during inactive periods. Rather, the gaming environment 208 and/or the game characters are preferably designed to evolve and change even without any input or feedback from the end users.

Perpetual universe server 202 is preferably configured to manage the triggering of events and the passing of data between various components of video game system 100. For example, perpetual universe server 202 may include or communicate with a scheduler 215 that regulates the processing and timing of competitions and training sessions. In this regard, scheduler 215 preferably communicates with Solomon engine 206 and/or simulation engine 204. Perpetual universe server 202 may utilize scheduler 215 to regulate: the transfer of digenome data, digenetic data, and/or game data to Solomon engine 206 or simulation engine 204; the processing of results files and animation script files (described below); and when animation script files or results files are transmitted to (or rendered by) the presentation devices 102.

In a preferred embodiment, perpetual universe server 202 need not generate any graphics elements for rendering on the presentation devices 102. Rather, it can update the positional information for the digenomes within the gaming environment in response to the actions of the digenomes, while leaving the graphics rendering to other components of video game system 100. Perpetual universe server 202 may be suitably configured to receive information related to the competition and/or training events simulated by video game system 100. For example, precomputed results and statistics may be communicated to perpetual universe server 202 from simulation engine 204.

Perpetual universe server 202 may also provide features related to end user interaction 210. For example, server 202 may allow end users to communicate with each other via messages, chat rooms, bulletin boards, or the like. Server 202 may also allow end users to: post competition challenges; arrange tournaments; view historical competition results; watch competitions between other digenomes; buy, sell, and trade, digenomes; promote competitions; and engage in any other form of communication with other end users, the system administrator, sponsors, or the like. As described above in connection with element 112, service site 104 is preferably configured to support a number of conventional messaging, email, and other communication tools.

Digenomes

The digenomes or game characters maintained by video game system 100 may be associated with a number of traits related to physical, emotional, cognitive, and other performance capabilities and characteristics. In a typical embodiment, each digenome within a given genre (e.g., tanks, robots, gladiators, race cars, boxers, or martial artists) is initially created with the same number and types of traits. However, a single genre may include or support two or more different types of digenomes, thus resulting in a different number of traits for that genre. Briefly, in the preferred embodiment of the present invention, each trait is defined or prescribed by a number of simulated or digitally represented "proteins" and each protein is defined by a number of simulated or digitally represented "genes" (in an attempt to emulate natural genetics). The computer-simulated digenetic code, structure, or pattern of a digenome is maintained throughout its life unless otherwise altered via digenetic therapy or digenetic mutation during the life of the digenome. The preferred embodiment of system 100 places boundaries and limitations on the emotional, cognitive, physical, and performance capabilities of each digenome, based on its digenetics.

Figure 3:
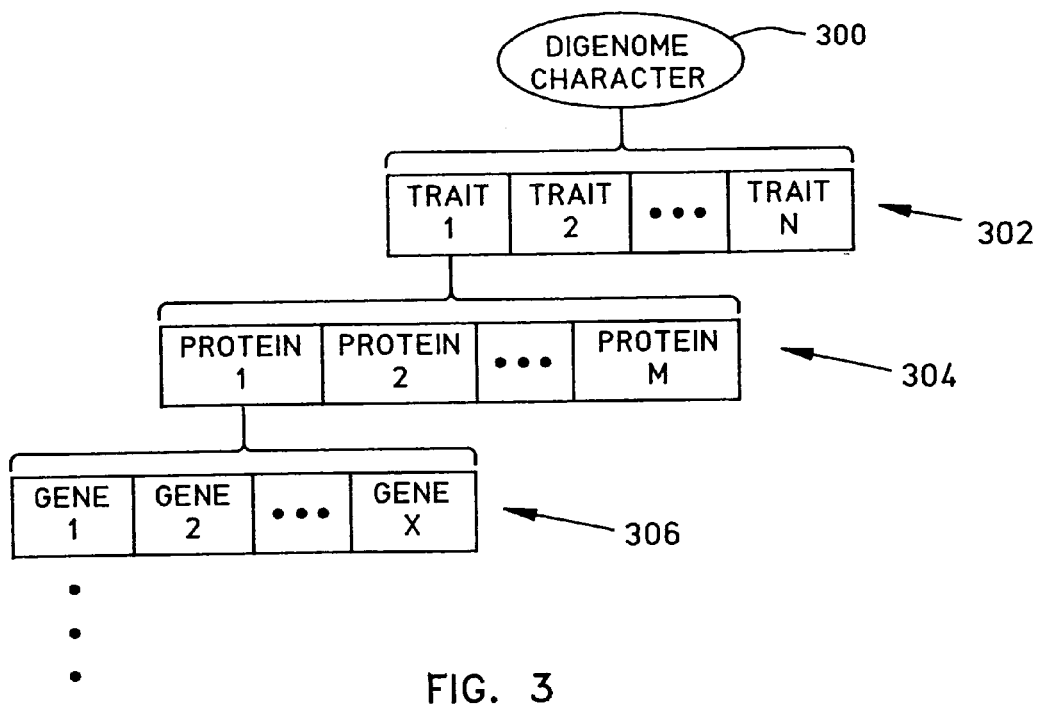
FIG. 3 is a diagram of a modeled genetic structure for a game character.

FIG. 3 is a diagram of an example model for the genetic structure of a digenome character 300. As mentioned briefly above, each digenome has a number of traits 302 associated with the digenome's capabilities, characteristics, and functionality. In a practical embodiment, the number and type of traits 302 will depend upon the digenome genre, the digenome features, and other factors related to the particular game environment. For example, a tank digenome may be associated with the following (and any number of other) traits: its half-maximum speed; its full speed; deceleration time from half-speed to a complete stop; its ammunition capacity; its fuel capacity; its maximum firing range; its firing frequency; and the like. In addition, the set of traits for a tank digenome may differ from the set of traits for a warrior digenome, which may include, without limitation: its strength; its speed; its age; its defensive capabilities; its offensive capabilities; its cognitive state, which may affect its decision making process; its visual acuity; its height; its weight; its emotional state, which may affect whether its fighting nature is aggressive or conservative; and the like.

The number of traits may be dictated by the desired amount of realism or randomness, the number or type of conditions or situations experienced by the digenome during training or competition, and/or the number or type of decisions executed by the digenome (or by video game system 100) during training or competition. When faced with a processing decision for a given digenome, system 100 analyzes a number of the digenome traits to determine how best to proceed. The precise number of traits associated with a specific decision may depend upon various factors such as the game conditions, the situational context, the type of decision, and other game parameters. As illustrated in FIG. 3, a given digenome may have any number (N) of traits that determine the capabilities and characteristics of that digenome. For example, in one practical embodiment, each tank digenome is defined by the same 31 traits (the relative quality, character, impact, or weight of the respective traits can vary from digenome to digenome).

In a practical embodiment, a trait may be directly related to the digenetics of the digenome character. For example, the maximum attainable speed, the maximum strength, and the visual acuity of a digenome are traits that are prescribed by the digenetics. These traits may be referred to as digenetic-based traits. Other traits (e.g., the amount of fuel remaining, the number of rounds remaining, whether the digenome is in possession of protective gear, the age of the digenome; and the like) may either be remotely related to or completely independent of the digenetic structure. These traits may be referred to as external traits or game parameter traits. Notably, one trait or characteristic may be linked to, related to, or otherwise have some effect on any number of other traits. For example, the age of a digenome may have an impact on a number of physical traits such as speed, strength, stamina, and balance. As the digenome ages, its physical performance (as dictated by such physical traits) may begin to decline after reaching a peak potential at a specific age, which may be unique to that digenome.

Video game system 100 maintains and processes the digenetic-based traits in a manner that emulates nature. For example, a digenetic-based trait such as maximum strength may vary among the population of digenomes that share that trait. As in nature, the digenetic-based trait has an average statistical value, level, amount, or other quantifiable characteristic (in a practical application, system 100 may represent a trait in any convenient manner, e.g., as a number within a defined range). In addition, the digenetic-based trait exhibits random (or pseudorandom) variations with respect to each individual digenome. Thus, some digenomes will have above average characteristics for that trait and some digenomes will have below average characteristics for that trait. In accordance with one preferred aspect of the present invention, any given digenetic-based trait can be suitably designed, distributed, and maintained by system 100 such that it follows a particular distribution function across the digenome population. Although any suitable distribution function can be modeled, system 100 preferably utilizes the Gaussian (or "bell curve") distribution function to emulate a natural distribution for certain traits. Alternatively, the traits may be modeled according to any of the following distribution functions: bipolar, Gamma, Rayleigh, exponential, or cumulative. It should be appreciated that digenetic-based traits may follow any suitable distribution function and that the present invention is not limited to any of the example distributions described herein.

As described above, each digenome character 300 can be defined by a number of traits 302. In the preferred embodiment, each trait 302 is in turn defined by an arbitrary number (M) of proteins 304 (in accordance with one practical embodiment, each trait 302 is governed by six proteins 304). Video game system 100 may represent a protein in any suitable manner. In one example embodiment, each protein is defined by a number within a predetermined range. For example, a protein that determines, in part, the speed of a tank digenome might range from two to four units of distance per unit of time. In this respect, the number or quantity represented by a protein may vary according to the particular digenome genre or the trait prescribed by that protein. The quantity or number representing a particular trait is generated by processing the respective M proteins 304 with a suitable algorithm or formula. In this respect, each trait 302 is derived from a number of proteins 304.

In accordance with the preferred embodiment of the present invention, video game system 100 designates each protein of a trait as either a primary protein, a secondary protein, or a tertiary protein. Of course, digenome character 300 may utilize any number of protein tiers or hierarchies and the present invention is not limited to primary, secondary, and tertiary proteins. In the example system described herein, each trait 302 comprises one primary protein, two secondary proteins, and three tertiary proteins. The primary protein has the most impact on the trait, the secondary proteins have an intermediate impact on the trait, and the tertiary proteins have the least impact on the trait. Arbitrary weighting factors may be applied to distinguish the protein tiers. The example embodiment uses the following primary, secondary, and tertiary weighting factors for the six proteins: 0.7 (primary); 0.1 (secondary); 0.1 (secondary); 0.05 (tertiary); 0.03 (tertiary); and 0.02 (tertiary). Notably, all of the weighting factors for a given "tier" (i.e., primary, secondary, or tertiary) need not be equal. A suitable trait generation algorithm using these weighting factors is set forth below, where T represents a value corresponding to the given trait and P represents the value of the different proteins:

$$T=0.7(P1)+0.1(P2)+0.1(P3)+0.05(P4)+0.03(P5)+0.02(P6)$$

It should be appreciated that a practical embodiment may employ different trait generation formulas and that this example is not intended to limit the scope or application of the present invention in any way.

A particular protein 304 may be used to derive any number of traits 302. In other words, a trait 302 need not be based on proteins 304 that are specific or unique to that trait 302. Furthermore, a particular protein 304 may be a primary protein for purposes of one trait, a secondary protein for purposes of a second trait, and/or a tertiary protein for purposes of a third trait. This flexible nature of the protein structure and hierarchy adds randomness and natural characteristics to the digenome character 300.

As depicted in FIG. 3, each protein 304 for digenome character 300 is defined by an arbitrary number (X) of genes 306. As with traits 302 and proteins 304, video game system 100 may represent a gene in any suitable manner (in a practical embodiment, each gene 306 is defined by a number within a predetermined range). In addition, a particular gene 306 may be used to affect more than one protein 304. System 100 may generate genes 306 according to any suitable methodology, protocol, or algorithm. In turn, proteins 304 are derived from the genes 306 using a suitable algorithm or formula. The gene creation algorithm and/or the protein generation algorithm may be designed to produce any suitable distribution function for the genes or the proteins.

In the preferred practical embodiment, two genes 306 are used to derive each protein 304, and each gene 306 is defined by a random number between zero and one. In accordance with one practical embodiment, video game system 100 creates genes 306 using a digital random number generator having substantially uniform distribution characteristics. In addition, the example embodiment employs a protein generation algorithm that results in a Gaussian distribution function for the proteins 304. Accordingly, system 100 is capable of creating new digenome characters 300 in a substantially random manner by generating the genes 306 with a digital random number generator, deriving proteins 304 from the genes 306, and deriving traits 302 from the proteins 304. The specific hierarchical relationship between genes 306, proteins 304, and traits 302 may also be determined randomly in accordance with the various algorithms and formulas described above. As shown in FIG. 2, game server architecture 200 preferably includes a program element (block 214) that controls the creation or birth of digenomes. This aspect of game server architecture 200 may be related to the digenetic processing described above, e.g., the random number generator, the protein generation algorithm, and the trait generation algorithm.

The digenetic structure for digenome character 300 may be extended indefinitely to incorporate any number of hierarchical levels, digenetic relationships, and/or digenetic elements. As used herein, a "digenetic element" is any unit, quantity, value, or parameter that affects or prescribes the characteristics of a digenome. In the context of the example described herein, each trait, protein, and gene is a digenetic element. The flexible nature of the digenetic pattern is represented by the ellipses in FIG. 3. Although not a requirement of video game system 100, the preferred embodiment models nature by assigning (at least initially) the same number of genes, proteins, and traits to each digenome type. System 100 may also be configured to accommodate digenetic mutations and modifications that result in digenetic inconsistencies among a digenome species.

In the preferred embodiment, each digenome includes a unique digenetic structure that ultimately dictates the physical, emotional, cognitive (and possibly other) characteristics and capabilities of the digenome. As found in nature, the unique digenetic structure of a digenome remains constant throughout its life (unless otherwise altered by mutation or digenetic gene therapy). Video game system 100 (and game servers 106 in particular) may create any number of digenomes, store the digenome data in database 108, and arbitrarily assign the digenomes to end users in connection with an initialization or registration process. Of course, game server 106 may create and save a population of digenomes for distribution as needed or it may create each digenome on demand. System 100 need not make any digenetic information available to the end users; the preferred embodiment keeps the digenetic information secure so that the end users cannot rely on the digenetic pattern to select or breed digenomes.

As mentioned previously, the digenetics of a digenome establish baseline characteristics for the development of that digenome's physical, cognitive, and performance capabilities. In other words, the digenome's potential (from a game-playing perspective) is predetermined by its digenetic structure. Thus, although the end user can develop the digenome's capabilities through training, learning, experience, and competition, the digenetics may place limits on such development. Notably, some digenetic-based traits, characteristics, or capabilities may be "fixed" or otherwise unaffected during the digenome's life. For example, the fuel capacity of a tank digenome may be a fixed characteristic and the natural vision of a knight digenome may be unaffected by training and exercise (although the vision may be positively affected by corrective lenses or negatively affected by combat).

Figure 4:
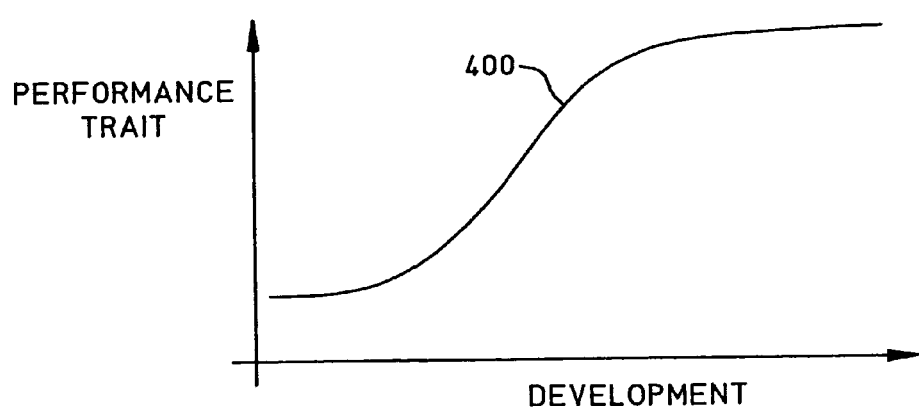
FIG. 4 is a graph showing an example developmental curve for a trait associated with a game character.

FIG. 4 is a graph showing an example developmental curve 400 for a performance trait (such as leg strength, speed, firing accuracy, or the like) associated with a video game character. Using digenetics as described above, video game system 100 can generate such baseline curves to govern the developmental limits of any number of digenome traits. It should be appreciated that developmental curve 400, and its general sigmoid characteristic, is merely one example that may be used by video game system 100. In practice, video game system 100 may utilize any number of developmental functions having different shapes and characteristics, depending upon the respective trait and the digenetic structure.

During competition and training, decisions, actions, movements, and responses of a digenome are preferably dictated by the current game conditions, game parameters, its traits, its current state of physical, emotional, cognitive, and performance development, and other factors. Accordingly, the conduct of the digenomes, the results of training, the effect of experience, and the results of competition are impacted by, responsive to, or based on the digenetics. Training, learning, and positive experiences may increase the performance level, while injuries, unfavorable competition results, and lack of training may decrease the performance level. However, the fundamental characteristics of developmental curve 400 preferably remain fixed during the life of the game character, as mandated by its digenetics. Similarly, the digenetic structure of a digenome is not normally affected by training, learning, or competition.

Digenome Evolution

As described above, a digenome's performance level can progress or regress in response to any number of events, conditions, or stimuli generated by video game system 100. In addition, system 100 is suitably configured to simulate digenome evolution through breeding, cloning, mutation, experimentation, and/or gene therapy. In this context, system 100 may allow end users to selectively mate digenomes (whether computer-owned or user-owned) in an attempt to generate digenome offspring having enhanced traits. In the preferred embodiment, the digenetic pattern of an offspring digenome is based on the digenetics of at least one of its parents. In addition, system 100 is preferably designed to disregard any parental characteristics or capabilities that have been developed through training, competition, or experience because such performance levels are not carried by the parental digenetics.

Perpetual universe server 202 may be suitably configured to provide breeding information, digenome capabilities data, competition results, and other data to end users looking to create offspring digenomes (see block 214 in FIG. 2). This feature can stimulate end user interest in the long-term role-playing aspect of the video game system 100, and well-developed digenomes can become valuable to gamers. From a commercial viewpoint, the system administrator can charge breeding fees to end users who desire to create offspring.

In operation, video game system 100 may enable an end user to mate his digenome with any number of computer-maintained digenomes and/or with any number of other end user digenomes. System 100 may provide, via gaming environment 208, any number of features that enable end users to locate suitable digenomes for breeding. In addition, a commercial embodiment of system 100 may charge breeding fees, request additional registration information, and obtain authentication information before creating offspring digenomes.

Figure 5:
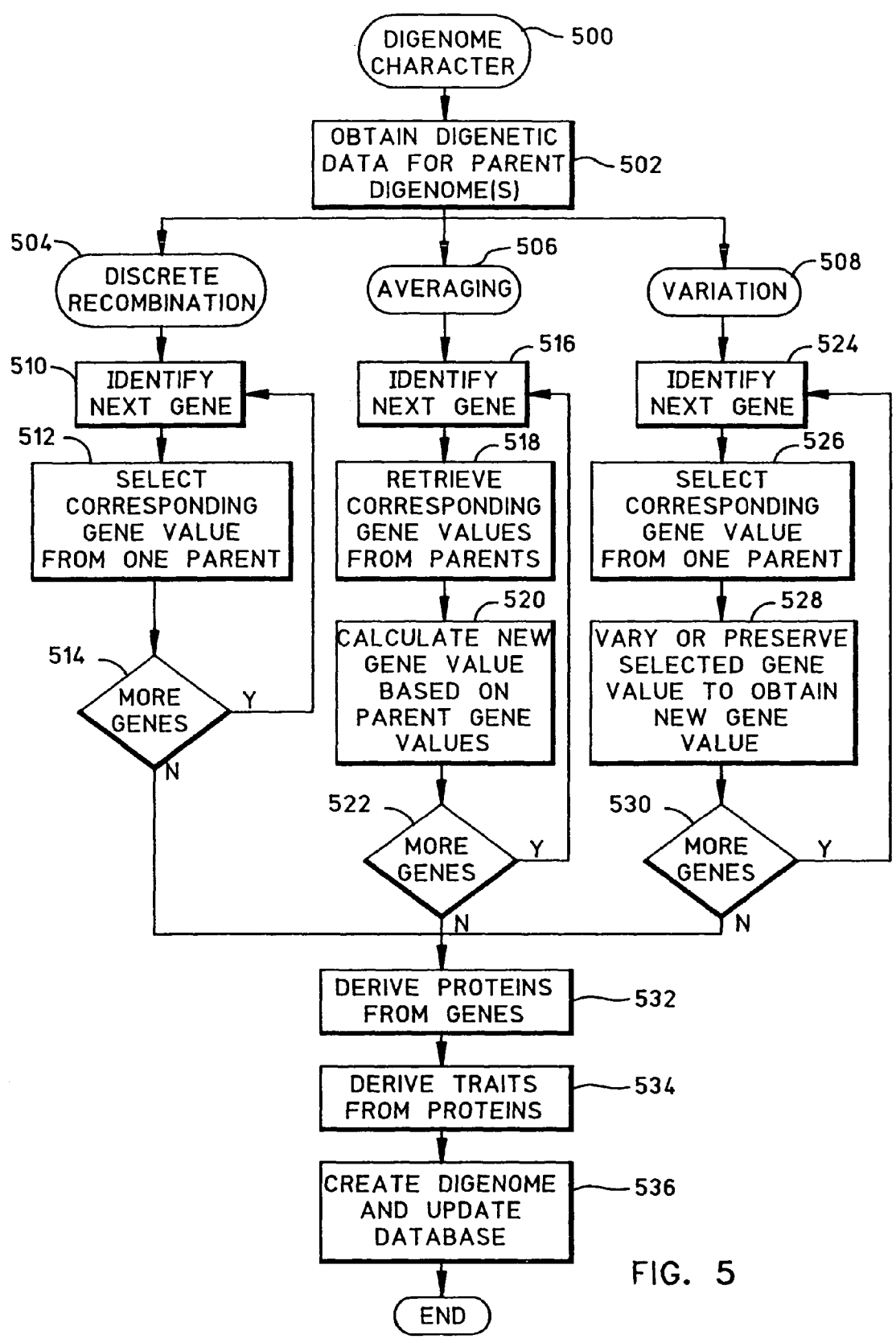
FIG. 5 is a flow diagram of a game character breeding process.

FIG. 5 is a flow diagram of a digenome breeding process 500 that may be performed by video game system 100. Although not required by the present invention, process 500 assumes that each parent digenome has the same number of genes, proteins, and traits. In other words, each parent digenome is of the same genre or species. Of course, system 100 may be suitably configured to allow cross breeding between two or more different digenome types. System 100 is capable of generating offspring from any number of parents, e.g., a traditional mating of two parent digenomes, mating two instances of the same digenome, or creating an offspring from more than two parents.

The breeding process 500 begins with an identification of the digenome parents. Game server 106 then obtains the digenetic data for the parent digenomes by interrogating database 108 (task 502). Video game system 100 preferably creates digenome offspring by processing the digenetic data of at least one of the parent digenomes. In this manner, the digenetic characteristics of one or more of the parents impact the digenetics of the offspring. The digenetic data can be processed in any suitable manner using any number of algorithms, formulas, or protocols. For example, FIG. 5 depicts three techniques that can be utilized by system 100: discrete recombination 504; averaging 506; and variation 508.

Briefly, the discrete recombination technique 504 combines the genes from the parent digenomes to create the set of genes for the offspring digenome. For example, the technique may identify a gene number, position, or memory location (task 510). Then, one of the parent digenomes is randomly selected and the selected parent's gene corresponding to the current number or position is used in the digenetic pattern of the offspring (task 512). If more unselected genes remain (query task 514), then tasks 510 and 512 are repeated. If all of the offspring genes have been selected, then query task 514 exits. In accordance with this technique, each offspring gene is effectively copied from one of the parents. Of course, the recombination technique 504 need not select the offspring genes on an individual basis, and any suitable combination scheme may be employed. For example, the recombination technique 504 can select a group of genes (e.g., gene numbers 1 to 20) from the first parent and a second group of genes (e.g., gene numbers 21 to 40) from the second parent.

The averaging technique 506 averages or otherwise processes the parental genes to generate the offspring's genes. For example, the averaging technique 506 may identify a gene number, position, or memory location (task 516) and retrieve the corresponding gene values from at least one of the parents (task 518). The gene values from the parent digenomes are processed by a suitable algorithm or formula to calculate the gene for the offspring digenome (task 520). In accordance with the practical embodiment described herein, each gene is represented by a number within a specific range. Consequently, the processing algorithm is suitably designed to generate offspring gene values within the same range. For example, the algorithm may generate a simple average value of the parent genes, a weighted average, any intermediate value, or a value that is higher or lower than either of the parent gene values. The specific algorithm employed by averaging technique 506 may vary from system to system. Tasks 518 and 520 are preferably repeated until all of the offspring's genes have been calculated (see query task 522). In accordance with this technique, each offspring gene is derived from one or more of the parent genes.

The variation technique 508 selects a gene from a parent digenome, alters or preserves its value, and copies it for use in the offspring digenetic pattern. As in the other techniques, the variation technique 508 may identify a gene number, position, or memory location (task 524) and retrieve the corresponding gene value from one of the parents (task 526). The gene selection performed in task 526 may be random or it may follow a particular algorithm, pattern, or formula. The gene value selected in task 526 is either preserved or varied according to any suitable algorithm or formula (task 528). For example, in accordance with one example algorithm, the selected gene value is either increased or decreased by a specified percentage. In accordance with another example embodiment, the processing carried out during task 528 includes a random component that introduces uncertainty into the digenome breeding process 500. Tasks 526 and 528 are preferably repeated until all of the offspring's genes have been calculated (see query task 530). In accordance with this technique, each offspring gene is derived from a corresponding gene taken from one of the parents.

The example techniques described above are not intended to restrict or otherwise limit the scope of the present invention. Indeed, a practical embodiment of the present invention may combine aspects from one or more of these digenetic breeding techniques. In addition, the specific algorithms, formulas, and protocols utilized during digenome breeding process 500 may vary from system to system, depending upon the desired evolutionary and "hereditary" characteristics.

Eventually, digenome breeding process 500 calculates and saves the individual gene values for the complete digenetic code of the offspring digenome. Thereafter, process 500 constructs, calculates, or otherwise derives the proteins from the gene values (task 532). As described above in connection with the creation of the digenetic pattern for a new digenome, the preferred practical embodiment derives each protein from two genes. Next, process 500 constructs, calculates, or otherwise derives the digenome traits from the protein values (task 534). As described above, the preferred embodiment assigns one primary, two secondary, and three tertiary proteins to each trait.

Following task 534, digenome breeding process 500 is able to provide video game system 100 with the digenetic data for the offspring character. In this respect, process 500 may "create" the offspring digenome by saving its digenetic data (along with a suitable identifier) and by updating database 108 to reflect the presence of the new digenome (task 536). In addition, process 500 may update any number of historical records to reflect the ancestry of the offspring digenome. Furthermore, process 500 preferably updates the end user records maintained by system 100 to reflect the ownership of the offspring digenome.

Video game system 100 can be configured to support digenome cloning. In practice, digenome cloning can be performed easily by copying the digenetic code from an existing digenome for use with a new digenome. Depending upon the particular system, any number of nondigenetic aspects of a digenome (such as physical appearance, learned experience levels, or physical conditioning) may also be carried forward to the clone. Of course, system 100 can be flexibly designed such that system administrators can prohibit or otherwise regulate cloning by end users.

Video game system 100 may also support digenome mutations and/or digenetic therapy. Digenetic mutation may be defined as an abnormal change to the digenetic structure of a digenome resulting in the creation of a new character or trait not found in the parental digenetics. Such mutation may occur as a result of breeding, in response to events occurring in the game environment (e.g., accidents), as a result of digenetic therapy, or in connection with any number of conditions or events controlled by system 100. System 100 preferably handles digenetic mutations in a random manner; the types of mutations, the severity of the mutations, and/or the frequency of mutation can be generated randomly. Of course, the types of mutations may depend on the particular system and the digenome genre. For example, digenetic mutations may result in: extraordinary strength; additional or unusual physical features; enhanced or degraded vision; altered cognitive capacities; or the like.

In a practical embodiment, digenetic mutations can be processed in any suitable fashion. For example, mutations may be generated at the gene level, at the protein level, and/or at the trait level. The details related to the creation and processing of such mutations may depend upon the complexity of the digenetics and the complexity of the relationships between genes, proteins, and traits. Digenetic mutations may be passed on to subsequent generations (with or without attenuation) or restricted to a single digenome.

Video game system 100 may also make any number of digenetic therapies available to the end users. For example, if an end user is unhappy with the performance of his or her digenome, it may be possible to mutate, upgrade, or otherwise modify the digenetic pattern, traits, and/or characteristics that define the digenome. As shown in block 214 (see FIG. 2), perpetual universe server 202 may generate any suitable digenetic therapy option or menu for the end users. Perpetual universe server 202 can be designed with any number of features to enable the end user to research the character's digenetic code and attempt to modify one or more traits by altering the code. In a commercial embodiment, the system administrator can charge fees for such digenetic therapy.

Digenetic therapy may be available during digenome breeding and during the life of an existing digenome. The amount of digenetic therapy and the specific types of traits and characteristics susceptible to digenetic therapy may vary from system to system, according to the particular game environment, and/or according to the digenome genre.

In a practical embodiment, digenetic therapy can be processed in any suitable fashion. Like mutations, digenetic therapy may affect the digenetics at the gene, protein, and/or trait level. For example, a simple digenetic therapy may simply boost the digenome's performance potential for a particular physical trait, while a complex digenetic therapy may require the alteration of individual gene values. The details related to the processing of digenetic therapies may depend upon the complexity of the digenetics and the complexity of the relationships between genes, proteins and traits. The affect of digenetic therapy may be passed on to subsequent generations (with or without attenuation) or restricted to a single digenome.

Game Playing Overview and Example Gaming Scenarios

Figure 6:
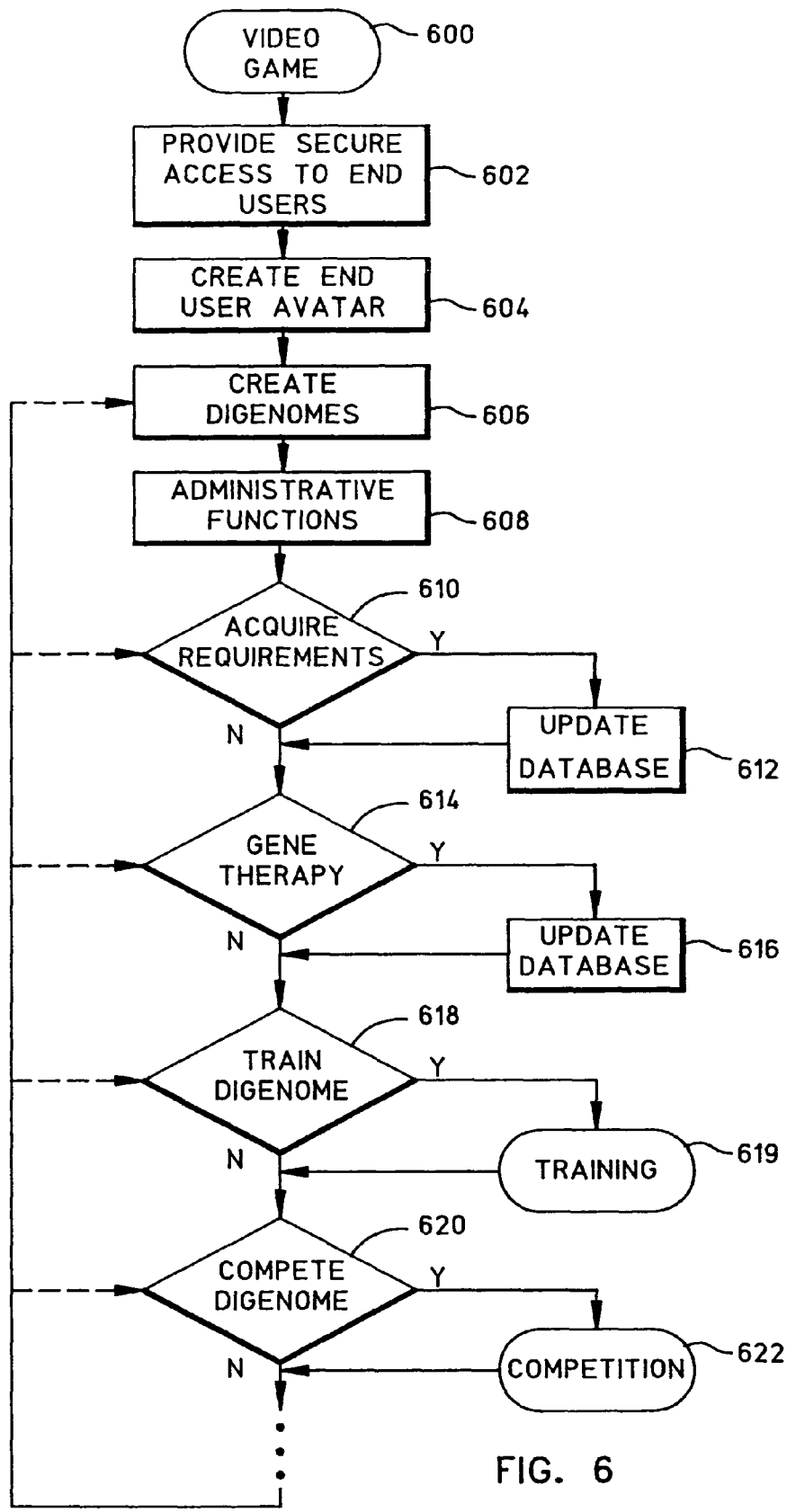
FIG. 6 is a flow diagram of an example video game process.

FIG. 6 is a flow diagram of an example video game process 600 that may be generally followed in the context of a practical implementation of video game system 100. A practical deployment of video game system 100 allows end users to access the game playing environment via the Internet. Consequently, the administrator of system 100 may provide online end user registration via a web site maintained by service site 104 (in a commercial embodiment, the system administrator may charge subscription fees for general access to the system 100). In accordance with known methodologies, system 100 assigns a username and password to each end user. In this manner, system 100 can provide secure network access to the end users (task 602) and otherwise regulate remote access to the game environment and the digenomes. Of course, system 100 may utilize any number of known authentication or security techniques in connection with end user access.

In the preferred practical embodiment, each end user creates a persona and graphical representation of himself (i.e., an avatar) for purposes of online communication and interaction with other end users (task 604). As described above, system 100 is preferably configured to support end user communication using any suitable communication technique, e.g., email, online messaging, audio/video files, and the like. The avatars (or a list of names) may be displayed for viewing by all online end users. The end user's avatar can be made to travel within the game environments, traverse the perpetual universe, schedule competitions with other end users, engage in precompetition banter and propaganda, research historical training and competition results involving other digenomes, buy, sell, and trade items related to any number of gaming environments (e.g., weapons, food, protective gear, door keys, vehicles, ammunition, insurance, or fuel), view training sessions and competitions involving other digenomes, and perform any number of actions related to the gaming experience offered by system 100.

During the registration process (or thereafter), one or more game characters or digenomes are selected by the end user or assigned to the end user (in a commercial embodiment, the system administrator may charge a registration or ownership fee for each digenome). In accordance with a server-based implementation, the digenomes are created by game server 106 and stored in databases 108 (task 606); digenomes may be individually created by video game system 100 immediately following a user request or in a batch fashion prior to a user request. The preferred embodiment allows an end user to request a new digenome or an offspring digenome. Alternate embodiments may also support cloning, mutation, or digenetic therapy (as described above) in connection with the creation of a digenome.

In the preferred network embodiment, end users are merely given access rights to their respective digenomes. Alternate embodiments of the present invention can distribute digenome files to end users in the form of a portable storage media such as floppy disks, magnetic tape devices, smart card components, or the like. If such portable versions of the digenome files are made available, additional security measures (such as data encryption) may be employed by video game system 100 to preserve the secrecy and integrity of the digenetic information.

Once a digenome is created, it preferably "lives" in one or more gaming environments maintained by video game system 100. In the preferred embodiment, the end user can remotely control the conduct and interaction of his digenomes by traversing the system web site in an appropriate manner. System 100 may monitor, maintain, regulate, control, and update the general status of all active digenomes, i.e., digenomes that have been assigned to an end user and digenomes that are computer-owned. In this respect, video game process 600 may be associated with any number of administrative functions (generally represented by task 608). As used herein, such administrative functions may include, without limitation, any number of the following: monitoring the online status and account accessibility of end users; monitoring the location of avatars and digenomes within the perpetual universe and the various gaming environments; providing a competition scheduler; updating historical competition and training statistics; maintaining interactive elements within the perpetual universe and the gaming environments; maintaining an end user chat room or an end user messaging system; providing training research and competition scouting capabilities to the end users; monitoring the injury status of the digenomes; qualifying or authorizing digenomes for participation in activities according to different criteria; and making past training sessions and past competitions available for viewing by end users.

While traversing the perpetual universe with his digenome or with his avatar, an end user can acquire enhancements or improvements such as additional food, weapons, training manuals, equipment, ammunition, fuel, or the like. For example, the perpetual universe may include a representation of a city having stores, libraries, restaurants, supply shops, treatment centers, offices, and the like. Video game system 100 preferably makes these interactive elements accessible to the end user's avatar or digenome. In a commercial embodiment, the system administrator can charge fees for access to such places and/or fees for items acquired by the end user. Alternatively, the purchase of enhancements may be integrated into the gaming environments such that digenomes and avatars are able to collect currency by winning competitions or in connection with other aspects of the game playing scenario. If the end user requests an enhancement (query task 610), then video game system 100 may be prompted to update databases 108 in a suitable manner (task 612).

In the preferred embodiment, databases 108 are generally updated to reflect any changes that impact the digenomes' ability to survive, compete, progress, or perform in the context of the respective gaming environment. Consequently, databases 108 are preferably updated to reflect any modifications to the digenome's physical, emotional, or cognitive capabilities and to reflect any changes to the digenome's equipment inventory. Although the acquisition of enhancements will typically improve the performance of the digenome in many areas, such acquisition need not always result in improved performance in all categories. For example, the purchase of a larger sword or protective armor may increase the digenome's offensive or defensive capabilities at the expense of slower reaction times and less stamina resulting from the additional weight of the objects. Regardless of the ultimate results, databases 108 are suitably updated such that the graphical rendering of the digenome and the results of training sessions and competitions can be properly simulated.

Video game system 100 may include a gene therapy option (query task 614), which allows an end user to attempt to enhance his or her digenome by modifying its digenetics. Such digenetic therapy is described in detail above. If digenetic therapy is performed, then databases 108 will be updated to reflect the altered digenetic code and/or any resulting changes in the digenome's physical, cognitive, or performance characteristics (task 616). Databases 108 may also be updated to indicate that the digenome has received digenetic treatment, thus providing notice to other end users.

In accordance with one preferred aspect of video game system 100, end users can train and exercise their digenomes while in the gaming environment. In this respect, perpetual universe server 202 may also include a character training component or element 212 (see FIG. 2). Character training element 212 can be suitably designed to provide any number of physical and/or cognitive training environments to the digenomes. In effect, training element 212 provides a no-risk or a low-risk opportunity for an end user to learn the capabilities of the digenome and to develop the digenome's cognitive acuity and physical skills without having to engage in actual combat or competition. In one preferred embodiment, training element 212 enables a digenome to achieve a relatively high level of performance by practicing, sparring, exercising, preparing, and/or learning. In the preferred embodiment, the peak level of cognitive and physical performance for a digenome is limited or otherwise dictated by its digenetic code.

If an end user decides to train his digenome (query task 618), then video game system 100 performs a suitable training process 619. In a practical embodiment, the respective presentation device may generate and send a suitable training or activity request to game servers 106. During process 619, the digenome may be exposed to any number of physical or cognitive exercises, practice competitions, drills, or the like. In response to a training session, the cognitive and/or physical capabilities of the digenome may be enhanced, hindered, or kept constant. The details of an exemplary training process are described below.

The foundation of video game system 100 is its ability to stage competitions between different digenomes. Accordingly, video game process 600 gives end users the option to participate in any number of competitions related to different game genres. If an end user decides to enter his digenome in a competition (query task 620), then video game system 100 performs an appropriate competition process 622. The respective presentation device may transmit a suitable competition or activity request to game servers 106 to initiate the competition. The particular competition or activity format may vary depending upon the game environment, the game genre, the digenome genre, the current performance capabilities of the digenome, and/or other game parameters. It should be appreciated that a competition or activity need not involve other digenomes. Furthermore, a competition or activity may involve any number of user-owned digenomes and/or any number of computer-owned digenomes. An exemplary competition process is described in detail below.

If the end user is not ready to compete his digenome, then video game process 600 may be re-entered at any suitable point. For example, in a practical embodiment, process 600 (or portions thereof) is performed such that video game system can respond immediately to any end user command or request. As mentioned above, a digenome can be made to participate in training exercises and to compete against digenomes owned by other end users and/or computer-generated digenomes. In addition, an end user may be given other options, e.g., the option to acquire digenome enhancements or game playing necessaries and the option to perform digenetic therapy. Of course, a particular system can be suitably customized to provide any number of interactive options and game features to the end users; the present invention is not limited to the example options and features described herein.

Digenome Competition

Video game system 100 can process digenome competitions in a number of different ways. For example, in one preferred embodiment, competitions are generated by game server 106 without the need for real-time control by an end user. In other words, system 100 need not be configured as a user-controlled (or "twitch") game that generates results that are dependent upon immediate feedback or input from the end user. In this embodiment, game server 106 may generate a suitably formatted file that can be accessed remotely by the end user, downloaded or transferred to the end user, or otherwise made available to the end user. As described in more detail below, a preferred embodiment processes "generic" data that are transmitted to the end user presentation device for subsequent processing and graphics rendering. An alternate embodiment of system 100 allows at least some interactive end user participation in the competition experience.

Figure 7:
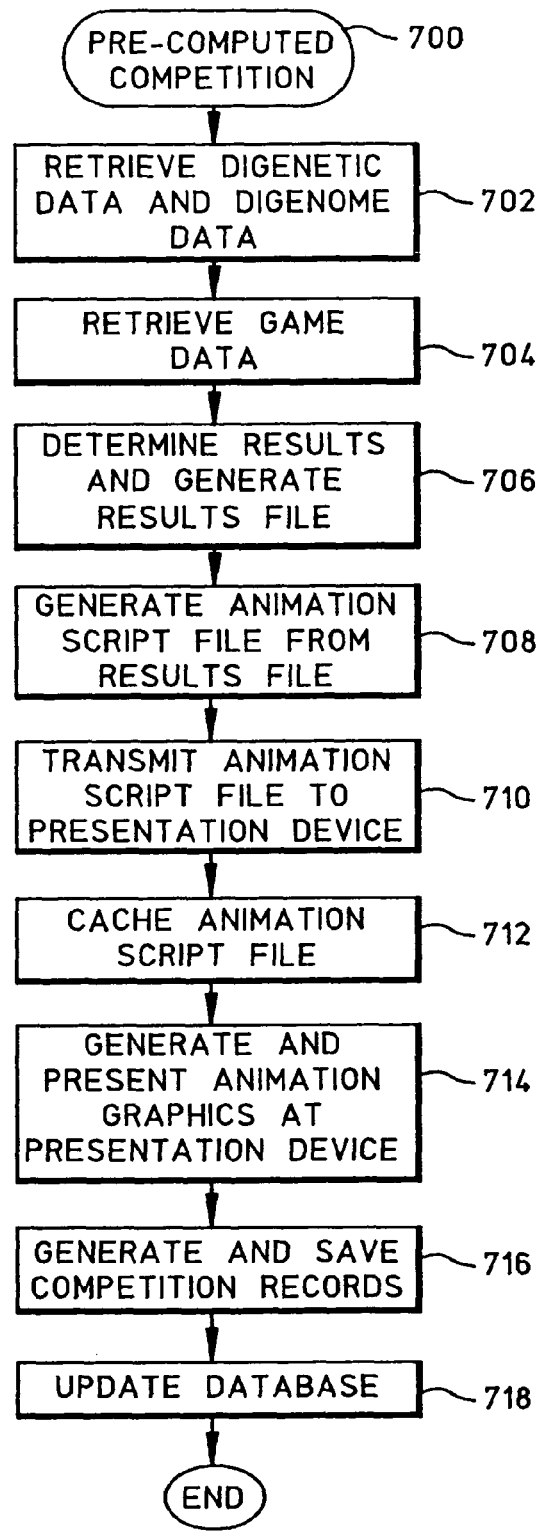
FIGS. 7 and 8 are flow diagrams of game character competition processes.

FIG. 7 is a flow diagram of a "precomputed" game character competition process 700 that may be performed by video game system 100. Process 700 is suitable for use in connection with competition process 622 (see FIG. 6). In accordance with one practical embodiment of system 100, digenome competitions are conducted without any user feedback or control during the competitions. In other words, the actions of the end user's digenome, the result of each digenome action, and the outcome of the competition are not controlled by the end user. In this respect, the results of the competition and the manner in which the competition will be graphically displayed to the end users are precomputed by system 100. Such an embodiment may be desirable to eliminate or reduce unwanted latency effects or other limitations related to communication channel bandwidth, the quality of network service, presentation device capabilities, and the like. Process 700 represents this type of competition scenario. In a practical embodiment, competition process 700 may be performed by one or more elements associated with game server 106. Accordingly, for the sake of illustration, process 700 will be described herein with reference to game server architecture 200 (see FIG. 2).

Competition process 700 begins by retrieving the digenetic data and the current digenome data for each of the digenomes participating in the competition (task 702). In accordance with the example embodiment described herein, these data are retrieved from database 108. The digenetic and digenome data are shown in FIG. 2 (identified by reference number 216). In this context, the digenetic data includes data representing the traits, characteristics, and tendencies of the digenomes. The digenetic data retrieved during task 702 may also include other data related to the digenetic structure, e.g., information associated with the proteins and/or genes. In contrast to the digenetic data, the digenome data includes data representing any number of variables, statistics, parameters, quantities, and/or other information that may impact the results of the competition or how the competition is simulated. For example, such digenome data preferably includes data related to: the digenomes' current physical, emotional, cognitive emotional states; the appearance of the digenomes; the digenomes' current performance levels; the status and inventory of equipment, weapons, fuel, food, clothing, or other items available to the digenomes; dynamic objects associated with the digenomes; and the like.

Competition process 700 may also retrieve game data 218 from, e.g., database 108 (task 704). In this context, game data 218 refers to any parameters, conditions, restrictions, limitations, or other information associated with the current game environment, where such information may have an impact on the outcome or determination of the competition. For example, game data 218 may include: the location and characteristics of environmental conditions; the availability and characteristics of interactive objects, e.g., weapons, food, or clothing; the presence and characteristics of buildings and other obstructions; and data related to dynamic objects included in the game environment.

As shown in FIG. 2, the game data 218 and the digenetic/digenome data 216 are suitably provided to Solomon engine 206. As described briefly above, Solomon engine 206 is utilized to determine the outcome and/or results of the competition based on the digenetics and digenome data 216 and the game data 218 (task 706). In other words, Solomon engine 206 processes the current game parameters, the digenetics of the game characters, the physical, emotional, and cognitive traits, characteristics, and tendencies of the game characters, and other digenome data, and divines the outcome of the competition. In addition, Solomon engine 206 determines how the ultimate outcome is reached and how the competition affects each participating digenome, i.e., it determines the progression of the competition from beginning to end.

Solomon engine 206 may employ any number of techniques to determine the results of individual events and the ultimate outcome of the competition. In accordance with a simplified embodiment, Solomon engine 206 may be programmed with a number of predetermined decisions for specific conditions; such decisions dictate the results of the competition. Alternatively, the decisions made by Solomon engine 206 may be governed by various artificial intelligence methodologies, decision algorithms, fuzzy logic, or the like.

In accordance with the preferred embodiment, video game system 100 utilizes neural network technologies, decision algorithms, and the digenetic characteristics of the competing digenomes during competition process 700. This aspect of the present invention enables the digenomes to learn continuously from competition experience. In this respect, the capabilities and learning capacity of any given digenome are substantially open-ended (subject to any limitations resulting from the digenetics of the digenome). For example, before making a decision on behalf of a digenome, Solomon engine 206 may analyze and process a number of relevant game conditions, a number of relevant digenome traits, and other factors. In contrast to a conventional artificial intelligence technique where the outcome for each decision is preprogrammed, Solomon engine 206 preferably analyzes one or more digenome traits or characteristics, which may vary during the life of the digenome.

In one practical embodiment, a neural network (or any suitable decision algorithm) makes each decision on behalf of a digenome. Briefly, an exemplary neural network includes a plurality of interconnected nodes, processing elements, units, or neurons, each having a weighted impact on the ultimate decision. In a typical gaming scenario, specific game conditions, game parameters, and/or digenome data components are entered into the neural network for each decision. The neural network generates the result of each decision based upon the entered data and based upon the current weighting factors associated with the various nodes. Thus, the end result for a given digenome decision, action, movement, or activity may be determined in response to game data 218 and digenetic/digenome data 216. In addition, the various weighting factors associated with the neural networks are preferably updated during the life of the digenome. The updating of the neural networks (and/or the updating of the decision algorithm) result in the evolutionary growth and learning of the digenomes.

In the preferred practical embodiment, Solomon engine 206 is capable of processing and determining each individual move, decision, action, reaction, and response of the digenomes. The number and types of individual computations and movements processed by Solomon engine 206 may vary depending on the specific system, game genre, competition scenario, or the like. Eventually, Solomon engine 206 generates a results file that represents the outcome of the competition (task 706). The results file may simply contain general information related to the competition, e.g., the results of individual movements, the overall results, and the type and severity of injuries sustained by the digenomes.

Simulation engine 204 processes the results file created by Solomon engine 206 in a suitable manner to generate an animation script file (task 708). Generally, simulation engine 204 generates a story line or event stream corresponding to the results file. In a practical embodiment, simulation engine 204 creates the frame-by-frame movement of the "bones" and "joints" of each digenome. The animation script file may also be responsive to the digenome data. For example, the animation script may vary according to the digenomes' injury status, the equipment utilized by the digenomes, and other features that affect the ultimate depiction of the competition. In the preferred embodiment, simulation engine 204 is configured to create the animation script file using a "generic" indexing format. The generic format ensures compatibility with any number of different presentation devices 102.

In a practical embodiment, the animation script file includes frame-by-frame stream of motion control points used to render the background, dynamic objects, and digenome characters that are the subject of the currently displayed environment. Other animation data may include triggered events, such as explosions, specialized animations, sound effects, flashing lights, special graphics effects, and the like. The animation script file is preferably encrypted so that the end user cannot easily modify the data. Even if an end user were successful in modifying the animation script file, such modification would not change or alter the corresponding data generated previously and stored by the game servers.

The system preferably separates the processing of the results file from the processing of the animation scripts to allow both processes to run as individual tasks and/or on distinct hardware devices to obtain additional processing speed. Such an arrangement allows the system to handle a large number of end users simultaneously. In addition, the use of the intermediate results file is desirable because Solomon engine 206 need not be aware of the graphics that are ultimately rendered during presentation to the end user or of the graphical textures that are used to render the appearance of the digenome characters. Rather, Solomon engine 206 processes the geometry and "boned" structure of the digenomes to determine which external surfaces make contact during competition, training, and character interaction. The simulation engine 204 may be aware of the graphics to be rendered on the presentation device or viewer 122, but it need not perform any internal graphical rendering. Rather, simulation engine 204 preferably creates an animation data stream referring to animation frames, keyframes, selected background and character geometry, textures, and the associated locations for processing by the presentation device.

The animation script data may include (or be associated with) timing information related to the synchronization, starting, and stopping of the corresponding animation graphics rendered at the presentation devices 102. For example, the animation script data may include timing markers (or data packets that include time stamps) that indicate when the graphics are to be rendered. The timing markers and time stamps can be used to control the local playback of the animation graphics. Thus, a plurality of end users may experience a competition at substantially the same time even though the results of the competition may have been precomputed by game servers 106.

In accordance with one practical embodiment, service site 104 transmits the animation script file to the appropriate presentation devices 102 (task 710). The animation script file can be transferred to the end user via email, direct download, in the form of a floppy disc or other portable data storage media, or the like. In the preferred Internet embodiment, the animation script file is streamed from game servers 106 to the respective presentation devices 102 using data packets. The presentation device receives the animation script file and stores the file in a local cache memory element (task 712). In this manner, the presentation device 102 need not attempt to simultaneously receive and render the animation script file. Ultimately, the caching of the animation script file can eliminate undesirable web-packet delays and traditional Internet-related transmission delays.

In response to the animation script file, the presentation device 102 generates a suitable animation graphics file formatted for presentation by the particular presentation device 102 (task 714). The generic nature of the animation script file allows each individual presentation device 102 to create the animation graphics file based on its current graphics rendering capabilities, display element resolution, processing capacity, and other restrictions or limitations of the presentation device 102. Thus, the animation script file contains information related to the desired content of the animation and the individual presentation device 102 determines how best to render the animation in light of its particular display and playback capabilities. As described above, the presentation of the animation graphics may be regulated or controlled by a number of timing markers contained in the animation script file.

As mentioned above, system administrators may allow individuals, companies, or entities to sponsor competitions, promote competitions, promote digenomes, and/or sponsor digenome teams. In a commercial embodiment, sponsors can pay fees in exchange for advertising rights, trademark and brand exposure, web site links, and other forms of exposure in the system web site, the perpetual universe, and the gaming environments. For example, competitions and competition venues may be associated with a sponsor's name or logo, which may be identified in connection with historical competition records, rendered in connection with the competition animation file, or displayed on billboards or signage within the perpetual universe. Consequently, the competition animation file can be suitably designed to include any number of graphics elements (e.g., clothing items, equipment, vehicles, or packaging) that include trademarks, logos, or company names.

Depending upon the specific embodiment, the animation graphics file may be generated and played immediately, or it may be generated and stored by the presentation device 102 for offline playback to the end user. In an alternate embodiment of video game system 100, game server 106 creates the animation graphics files and makes them available for viewing by presentation devices 102. In other words, presentation devices 102 need not play an active role in the creation of the animation graphics files. In such an embodiment, the animation graphics files may be accessed remotely and viewed by the end users over network 114 or they may be downloaded to the presentation devices 102 in any conventional video file format.

Once task 706 is completed (and preferably after the end users have viewed the animation file), competition process 700 generates and saves competition records associated with the current competition (task 716). In this context, a competition record may include data related to: the date and time of the competition; the digenomes involved in the competition; the game environment or virtual location where the competition was staged; the winner or winners of the competition; the results of the competition; the current win/loss records of the competitors; an identification of the respective end users or avatars; and other information or statistics suitable for inclusion in a historical results database. The historical competition data can be made available to end users via an appropriate feature in the perpetual universe.

Once task 706 is completed (and preferably after the end users have viewed the results animation file), competition process 700 updates database 108 to reflect any changes to the digenome data and other game parameters (task 718). For example, any of the following items may be modified in response to a competition: the experience levels of the digenomes; the cognitive or physical performance capabilities of the digenomes; the injury status of the digenomes; the current state of game parameters such as ammunition, food, fuel, equipment inventories, and the like; the appearance characteristics of the digenomes; the age of the digenomes; and the weighting factors utilized by any neural networks. The improvement or degradation in digenome performance levels may be governed by predetermined increments. Alternatively, such improvement or degradation may be determined dynamically or calculated in response to the competition results.

In accordance with the preferred embodiment, the physical appearance of a digenome may be updated throughout its life to reflect its current physical conditioning, injuries, accumulated equipment, and the like. For example, video game system 100 can alter the musculature of a digenome to reflect physical exercise or training. In addition, injuries (e.g., cuts, bruises, scars, broken bones), their current state of healing, and any visible effects of such injuries can be updated continuously for display rendering. In this respect, system 100 adds a measure of realism to the perpetual nature of the gaming environment.

The constant updating of database 108 enables video game system 100 to simulate learning, growth, and digenome development in a realistic manner. Video game system 100 may implement different synchronization techniques to ensure that competition records and/or digenome data are updated in an appropriate time frame. For example, it may be desirable to delay such updating for a number of days or until each end user has viewed the results of the competition.

Figure 8:
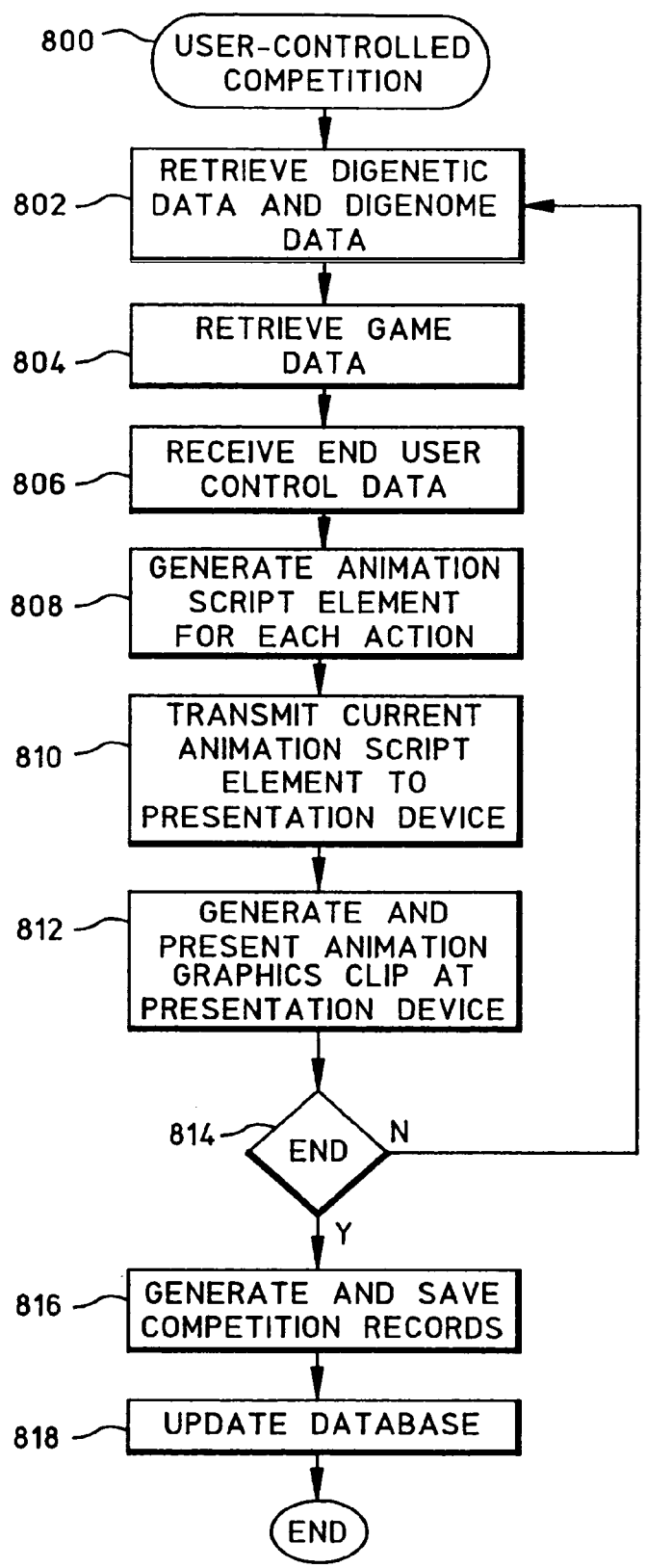

An alternate embodiment of video game system 100 is capable of processing competitions in which one or more digenomes are controlled by end users. In practice, the controlling end user will be interacting with the game server 106 in a substantially real-time manner. In such an embodiment, Solomon engine 206 need not be deployed. The dashed lines in FIG. 2 represent functional relationships associated with a game server architecture 200 according to this alternate embodiment, and FIG. 8 is a flow diagram of an exemplary competition process 800 that may be performed by this alternate embodiment.

Competition process 800 begins by retrieving the digenetic data and digenome data for the game characters participating in the competition (task 802). Process 800 also retrieves the current game data from database 108 (task 804). Tasks 802 and 804 are equivalent to tasks 702 and 704, respectively (see above description of competition process 700). Process 800 accommodates user interaction by receiving end user control data 220 from presentation devices 102 (task 806). The end user control data 220 may be suitably formatted and transmitted to service site 104 using any number of conventional data communication techniques known to those skilled in the art. The end user control data 220 may be generated by any user interface or data entry device, e.g., a keyboard, a mouse, a joystick, a trackball, a touchscreen, a pointer, a voice recognition interface, or the like. The end user control data 220 may represent any actions, commands, or movements of the digenome in the game environment.

The digenetic data, digenome data, and end user control data serve as inputs to simulation engine 204. In response to such input data, simulation engine 204 determines the capabilities of each digenome and generates each moment-to-moment decision and movement of the digenomes based on the digenetics 216, the history of training and competition experience, and evolutionary abilities of the digenomes. In lieu of Solomon engine 206, simulation engine 204 is suitably configured to receive the data necessary to compute each movement, action, reaction, and response (physical, emotional, and cognitive) of the competing digenomes. In this manner, simulation engine 204 eventually generates the results and outcome of the competition.

Competition process 800 preferably causes simulation engine 204 to generate an animation script element for the current action, movement, scene, or frame of the competition (task 808). In the preferred embodiment, the animation script element is formatted in a universal or generic manner. Task 808 determines the outcome of the current move or action using the techniques described above in connection with tasks 706 and 708. However, task 808 need not generate the entire animation script for the entire competition. Rather, task 808 may be limited to the generation of a small excerpt or clip of the competition. The duration of each animation script element and the processing frequency may vary depending upon the complexity of the game scenario, the number of actively participating end users, and/or the amount of digenome control given to the end users.

A task 810 may be performed to transmit the current animation script element to the presentation devices 102 (task 810 is equivalent to task 710 described above). In response to each animation script element, the presentation device 102 generates an animation graphics clip or element for playback to the end user (task 812). The equivalent creation of an animation graphics file from an animation script file is described above in connection with task 714. Accordingly, the end user is able to participate in the competition and experience the results in a substantially real-time manner. In a preferred practical embodiment, the individual animation graphics clips are generated seamlessly such that the end user perceives the competition results as if it were a continuous event.

If the competition has not ended (query task 814), then competition process 800 may be re-entered at task 802. Thus, game server 106 can receive updated digenome data, updated game data, and/or additional end user control data generated in response to the current state of the game environment. Notably, the digenome data may be updated rapidly to simulate digenome development that occurs during the competition itself. Thus, tasks 808, 810, and 812 can be repeated to generate any number of animation script elements, transfer the animation script elements to the presentation devices, and create the corresponding animation file elements.

If query task 814 determines that the competition has ended, then process 800 generates and saves competition records associated with the event (task 816) and updates database 108 to reflect any changes to the digenome data (task 818). Tasks 816 and 818 are equivalent to tasks 714 and 716 (described above).

Digenome Training

Figure 9:
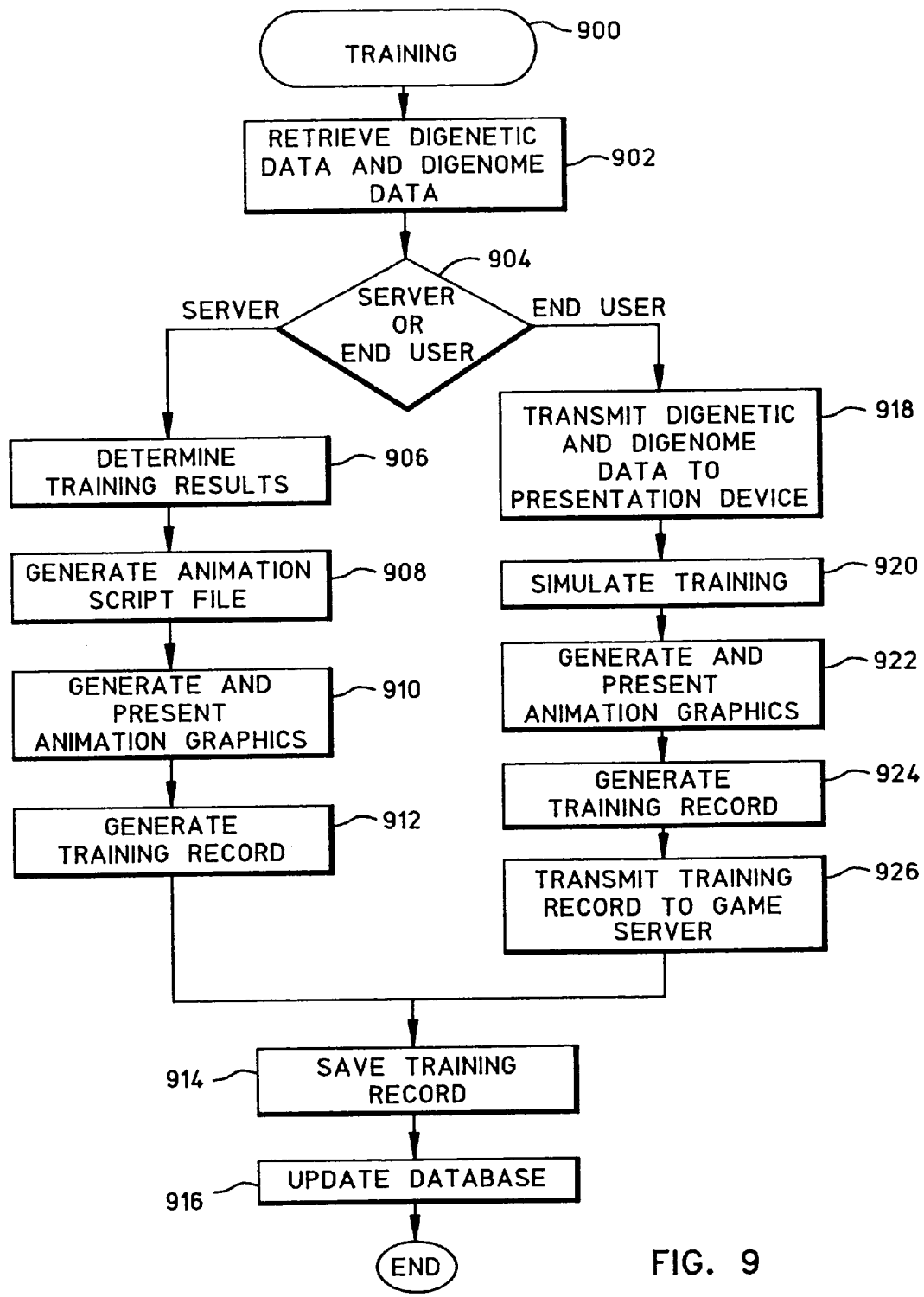
FIG. 9 is a flow diagram of a game character training process.

FIG. 9 is a flow diagram of an example game character training process 900 that may be utilized by video game system 100 (see element 619 in FIG. 6). As described above, process 900 is preferably performed in response to an end user request to train at least one digenome. For the sake of convenience, process 900 is directed to the training of a single digenome. However, a practical embodiment of video game system 100 may be suitably configured to accommodate the simultaneous training of any number of digenomes. Video game system 100 may provide different training modes (e.g., physical exercise, mental preparation, mock competitions, or sparring) depending upon the game genre and digenome type. By interacting with the perpetual universe, the end user may be given the option to select a specific form of training, contact sparring partners, schedule mock competitions, and the like. As described above, system administrators can generate revenue from a practical embodiment of system 100 by allowing companies or entities to "sponsor" training sessions, post advertisements in exercise rooms, or promote specific digenomes;

Training process 900 may begin by retrieving (from, e.g., database 108) the digenetic data and/or the digenome data for the digenome participating in the training session (task 902). Task 902 is similar to task 702 described above in connection with the digenome competition process 700. During task 902, process 900 may retrieve digenome data related to the digenome's current state of physical and cognitive development, the digenome's developmental growth potential as dictated by its digenetics (described above in connection with FIG. 4), equipment and supplies available to the digenome, and the like. In this respect, video game system 100 may be suitably configured such that task 902 selectively retrieves data relevant to the digenome's training.

Video game system 100 can process digenome training in different ways. For example, system 100 may perform training in an autonomous manner without end user participation. On the other hand, system 100 may allow the end user to remotely control his digenome, via network 114, during training process 900. Both of these options rely on processing carried out by game server 106. In yet another practical embodiment, end users may be authorized to perform offline digenome training at presentation devices 102. In such an embodiment, the presentation device 102 (or another device or system maintained by the end user) processes the digenome training in an offline manner. Although not a requirement of the present invention, system 100 may be suitably configured to provide the different training options to the end users. Thus, process 900 contemplates both server-based and offline training scenarios.

If the training process 900 utilizes the server-based technique (see query task 904), then a task 906 is prompted. The general server-based technique illustrated in FIG. 9 can apply to both a user-controlled training session and a training session that is fully controlled by video game system 100. During task 906, game server 106 determines the training results by analyzing and processing the appropriate digenetic, digenome, game, and/or training environment data. Task 906 may utilize the same techniques described above in connection with the competition processes (see the description of tasks 706 and 808). However, in the context of a training activity, the results may be governed by any number of qualifying parameters. For example, in contrast to an actual competition, the results of a training competition or battle may be generated in response to certain damage control, risk reduction, or other protective measures. In conjunction with task 906, game server 106 generates a suitable animation script file or a number of animation script elements (task 908). Task 908 may utilize the same techniques described above in connection with the competition processes (see the description of tasks 708 and 808).

The animation script file (or file elements) is eventually transmitted to the respective presentation device 102, which generates and presents a suitable animation graphics file (task 910). Task 910 may utilize the same techniques described above in connection with tasks 714 and 812. As mentioned above, the animation graphics file may include any number of visual indicia or elements associated with sponsors or advertisers. In addition, the animation file may include any number of elements that distinguish the training environment from the competition environment, e.g., different clothing and equipment. Depending upon the specific embodiment, the results of the training session can be viewed by the end user in a substantially real-time online manner or at any convenient online or offline time.

Following the completion of the training session, game server 106 preferably generates a training record (task 912) for the given training session. The training record may include, without limitation, data related to one or more of the following: the date and time of the training session; the identities of the participating digenomes; the training environment or virtual location of the training session; the winner or winners of any mock competition; the results of the training session; an identification of the respective end users or avatars; and other information or statistics suitable for inclusion in a historical training database. Eventually, the training record is saved (in, e.g., database 108) such that the historical data can be made available to the end users via an appropriate feature in the perpetual universe (task 914). Task 914 is similar to tasks 716 and 816 (described above in connection with the competition processes).

Once the training session is completed, training process 900 updates database 108 to reflect any changes to the digenome data and other game parameters (task 916). Such database updating is described in detail above in connection with tasks 718 and 818.

If the user-controlled technique is selected, then service site 104 may be instructed to transmit digenetic data, digenome data, game data, and/or training environment data to the end user's presentation device 102 (task 918). Video game system 100 may employ data encryption or other security measures to preserve the integrity of the transmitted data and to ensure that the end user does not alter digenetic code. Once the relevant data have been received by presentation device 102, the digenome training will be simulated in an independent manner (task 920). Accordingly, presentation device 102 may be further configured to generate training results and create suitable animation files associated with the training session (as described above in connection with the competition processes). In this respect, presentation device 102 may include any number of software modules devoted to the training simulation. In a preferred embodiment, such offline processing allows the end user to control his digenome and otherwise participate in the training session in a mode that is free from network latency and remote processing issues.

Once the presentation device 102 has simulated the training session 102, it may generate and render the animation graphics for the end user (task 922). Thereafter, the presentation device 102 can generate a training record (task 924) as described above in connection with task 912. Eventually, the training record and/or any data related to the training results is transmitted back to game server 106 (task 926). In a practical embodiment, task 926 can be performed automatically the next time the end user logs onto the Internet or the system web site. Alternatively, task 926 may require user action in response to a specific command or request generated by video game system 100. After the training record is transmitted back to service site 104, tasks 914 and 916 are performed (as described above) to save the training record in database 108 and to otherwise update database 108 to reflect any changes to the digenome data.

The offline training techniques and processes described above may also be applied in the context of offline competitions. In this manner, an end user may engage in an offline competition with a computer-generated digenome and/or another end user's digenome and upload the results back to the game servers. In such a scenario, the game system may implement additional security, encryption, authentication, and/or certification procedures to ensure that the integrity and validity of the game data and digenome data are not compromised.

It should be appreciated that video game system 100 need not always generate animation files for the training sessions.

Indeed, system 100 may be configured to merely process the training results, modify the digenome data in response to the training, and provide a suitable notification to the participating end users. In this manner, an end user can simply schedule a training session that is automatically carried out by system 100 without any further involvement by the end user.

Alternate Applications for Digenomes

Digenomes may also be employed in more traditional video game contexts, in other entertainment applications, in an advertising or marketing capacity, and in other applications. The fundamental digenetic nature of the digenomes and their evolutionary characteristics make them suitable for use in any system or application that utilizes characters driven by artificial intelligence. For example, digenomes can be utilized in a traditional video game application having no networking capabilities; an evolutionary digenome can replace a preprogrammed video game character (whether or not that character is controlled by the user) that reacts in a predictable way in response to certain conditions. Digenetic game or role playing characters can be deployed in any number of exclusively server-based applications, e.g., virtual pets, simulated societies, or any hosted game environment. Furthermore, digenomes can replace traditional computer opponents in computer games such as chess, checkers, backgammon, poker, or the like.

Digenomes may also be employed in an advertising or marketing context. For example, a digenome may be used as a "spokesperson" that is capable of evolving to better promote a certain product or service. The digenome's characteristics and behavior can be made responsive to consumer feedback and reactions. In this manner, the behavior of a digenome can be optimized according to the preferences, likes, and dislikes of a particular market segment. The promotional digenome may respond to direct feedback (e.g., responses to specific questions) or to indirect feedback (e.g., consumer profiling). Once a set of suitable characteristics has been determined, the digenome's behavior may be fixed or further developed on an ongoing basis.

The present invention has been described above with reference to preferred embodiments. However, those skilled in the art having read this disclosure will recognize that changes and modifications may be made to the preferred embodiments without departing from the scope of the present invention. These and other changes or modifications are intended to be included within the scope of the present invention, as expressed in the following claims.

What is claimed is:

1. A computer readable memory to direct a computer to generate a video game character for use in a video game, comprising:
    executable instructions stored in said memory, said executable instructions including:
        instructions for generating a computer-simulated genetic ("digenetic") structure comprising a plurality of digenetic components;
        instructions for generating a number of computer-simulated performance capabilities, each prescribed by a number of said digenetic components, said performance capabilities contributing to activity results for said video game, each of said digenetic components determining any number of said performance capabilities, and at least one of said digenetic components determining a plurality of said performance capabilities; and
        instructions for generating a number of computer-simulated cognitive characteristics, each prescribed by a number of said digenetic components, said cognitive characteristics contributing to activity results for said video game according to a decision algorithm, each of said digenetic components determining any number of said cognitive characteristics, and at least one of said digenetic components determining a plurality of said cognitive characteristics.

2. The computer readable memory according to claim 1, wherein said digenetic structure comprises a hierarchical arrangement of a plurality of digenetic elements.

3. The computer readable memory according to claim 2, wherein said hierarchical arrangement comprises:
    a plurality of first tier digenetic elements representing said number of performance capabilities and said number of cognitive characteristics; and
    a plurality of second tier digenetic elements from which said first tier digenetic elements are derived.

4. The computer readable memory according to claim 3, wherein:
    each of said first tier digenetic elements represents a computer-simulated trait for said video game character; and
    each of said second tier digenetic elements represents a computer-simulated protein for said video game character.

5. The computer readable memory according to claim 3, wherein each of said first tier digenetic elements is derived from a like number of said second tier digenetic elements.

6. The computer readable memory according to claim 3, wherein said hierarchical arrangement further comprises a plurality of third tier digenetic elements from which said second tier digenetic elements are derived.

7. The computer readable memory according to claim 6, wherein:
    each of said first tier digenetic elements represents a computer-simulated trait for said video game character;
    each of said second tier digenetic elements represents a computer-simulated protein for said video game character; and
    each of said third tier digenetic elements represents a computer-simulated gene for said video game character.

8. The computer readable memory according to claim 6, wherein each of said second tier digenetic elements is derived from a like number of said third tier digenetic elements.

9. In a video game system, a method for creating and maintaining a video game character comprising the steps of:
    generating a number of lower tier computer-simulated genetic ("digenetic") elements for said video game character;
    deriving a number of higher tier digenetic elements for said video game character, each of said higher tier digenetic elements being derived from a number of said lower tier digenetic elements, each of said lower tier digenetic elements determining any number of said higher tier digenetic elements, and at least one of said lower tier digenetic elements determining a plurality of said higher tier digenetic elements;
    generating a set of performance capabilities and cognitive parameters for said video game character, said set of performance capabilities and cognitive parameters being prescribed by said higher tier digenetic elements; and
    interpreting said cognitive parameters according to a decision algorithm.

10. A method according to claim 9, wherein said deriving step derives said higher tier digenetic elements randomly in accordance with a distribution function.

11. A method according to claim 9, further comprising the step of storing said set of performance capabilities and cognitive parameters for use in determining a result for an activity of said video game character.

12. A method according to claim 11, further comprising the step of updating said set of performance capabilities and cognitive parameters in response to said result.

13. A method according to claim 11, further comprising the steps of:
storing a set of appearance characteristics for said video game character; and
updating said set of appearance characteristics in response to said result.

14. A method according to claim 9, wherein:
each of said lower tier digenetic elements represents a computer-simulated gene for said video game character; and
each of said higher tier digenetic element represents a computer-simulated trait for said video game character.

15. A method according to claim 9, wherein each of said lower tier digenetic elements is randomly generated.

16. A method according to claim 15, wherein each of said lower tier digenetic elements is generated randomly in accordance with a uniform distribution function.

17. A method according to claim 16, wherein each of said lower tier digenetic elements is generated randomly to represent a number between zero and one.

18. A method according to claim 9, further comprising the step of deriving a number of intermediate tier digenetic elements for said video game character, each of said intermediate tier digenetic elements being derived from a number of said lower tier digenetic elements, wherein each of said higher tier digenetic elements are further derived from a number of said intermediate digenetic elements.

19. A method according to claim 18, wherein:
each of said lower tier digenetic elements represents a computer-simulated gene for said video game character;
each of said intermediate tier digenetic elements represents a computer-simulated protein for said video game character; and
each of said higher tier digenetic elements represents a computer-simulated trait for said video game character.

20. A method according to claim 18, wherein each of said intermediate tier digenetic elements is associated with a weighting factor.

21. A method according to claim 20, wherein each of said intermediate tier digenetic elements is associated with either a primary, a secondary, or a tertiary weighting factor.

22. A method according to claim 21, wherein:
each of said higher tier digenetic elements is derived from six intermediate tier digenetic elements; and
of said six intermediate tier digenetic elements, one is associated with a primary weighting factor, two are associated with a secondary weighting factor, and three are associated with a tertiary weighting factor.

23. A method according to claim 9, wherein:
said digenetic elements represent a digenetic structure for said video game character; and
said digenetic structure prescribes a number of developmental limits for said video game character.

24. A method according to claim 23, wherein said developmental limits correspond to physical performance levels.

25. A method according to claim 23, wherein said developmental limits correspond to cognitive performance levels.

26. A method for creating an offspring video game character based on at least one existing video game character, said method comprising:
obtaining a computer-simulated genetic structure for a first parent video game character ("first parent digenetic structure"), said first parent digenetic structure comprising a plurality of computer-simulated genetic ("digenetic") components;
deriving an offspring digenetic structure from said first parent digenetic structure;
generating a set of performance capabilities and cognitive parameters for said offspring video game character, said set of performance capabilities and cognitive parameters being prescribed by said offspring digenetic structure, each of said digenetic components determining any number of said performance capabilities, each of said digenetic components determining any number of said cognitive parameters, at least one of said digenetic components determining a plurality of said cognitive parameters, and at least one of said digenetic components determining a plurality of said performance capabilities;
storing said set of performance capabilities and cognitive parameters for use in connection with said offspring video game character; and
interpreting said cognitive parameters according to a decision algorithm.

27. A method according to claim 26, further comprising the step of obtaining a second parent digenetic structure for a second parent video game character, wherein said deriving step derives said offspring digenetic structure from said first parent digenetic structure and from said second parent digenetic structure.

28. A method according to claim 27, wherein said deriving step derives said offspring digenetic structure by selecting individual digenetic elements from said first and second parent digenetic structures.

29. A method according to claim 27, wherein said deriving step derives said offspring digenetic structure by calculating offspring digenetic elements from digenetic elements selected from said first and second parent digenetic structures.

30. A video game character processing method comprising:
creating a computer-simulated genetic ("digenetic") structure for a video game character, said digenetic structure comprising a plurality of digenetic components;
storing a set of performance capabilities and cognitive parameters for said video game character, each performance capability and cognitive parameter being prescribed by a number of said digenetic components, each of said digenetic components determining any number of said performance capabilities, each of said digenetic components determining any number of said cognitive parameters at least one of said digenetic components determining a plurality of said cognitive parameters, and at least one of said digenetic components determining a plurality of said performance capabilities;
simulating an activity for said video game character according to a decision algorithm;

generating an outcome of said activity, said outcome being responsive to said set of performance capabilities and cognitive parameters interpreted according to said decision algorithm; and updating said set of performance capabilities and cognitive parameters in response to said outcome.

31. A method according to claim 30, wherein:

said decision algorithm governs decisions and actions of said video game character said decision algorithm responds to said set of performance capabilities and cognitive parameters; and said method further comprises the step of modifying said decision algorithm in response to said outcome.

32. A method according to claim 30, further comprising the steps of:

storing a set of appearance characteristics for said video game character; and updating said set of appearance characteristics in response to said outcome.

* * * * *